(12) United States Patent
Zanaboni

(10) Patent No.: US 11,179,920 B2
(45) Date of Patent: Nov. 23, 2021

(54) MULTILAYER NON-CROSS-LINKED HEAT-SHRINKABLE PACKAGING FILMS

(71) Applicant: Cryovac, LLC, Charlotte, NC (US)

(72) Inventor: Giuliano Zanaboni, Trecate (IT)

(73) Assignee: Cryovac, LLC, Charlotte, NC (US)

( * ) Notice: Subject to any disclaimer, the term of this patent is extended or adjusted under 35 U.S.C. 154(b) by 118 days.

(21) Appl. No.: 16/472,055

(22) PCT Filed: Jan. 17, 2018

(86) PCT No.: PCT/EP2018/051063
§ 371 (c)(1),
(2) Date: Jun. 20, 2019

(87) PCT Pub. No.: WO2018/134224
PCT Pub. Date: Jul. 26, 2018

(65) Prior Publication Data
US 2020/0115123 A1   Apr. 16, 2020

(30) Foreign Application Priority Data

Jan. 17, 2017   (EP) ..................................... 17151884

(51) Int. Cl.
| | | |
|---|---|---|
| *B32B 27/08* | (2006.01) | |
| *B32B 7/028* | (2019.01) | |
| *B29C 48/00* | (2019.01) | |
| *B29C 48/10* | (2019.01) | |
| *B29C 48/18* | (2019.01) | |
| *B29C 48/151* | (2019.01) | |
| *B29C 48/88* | (2019.01) | |
| *B32B 1/08* | (2006.01) | |
| *B32B 27/30* | (2006.01) | |
| *B32B 27/32* | (2006.01) | |
| *B32B 27/36* | (2006.01) | |
| *B65D 65/40* | (2006.01) | |
| *B29C 48/21* | (2019.01) | |
| *B29C 48/335* | (2019.01) | |
| *B29C 48/92* | (2019.01) | |
| *B29K 27/00* | (2006.01) | |
| *B29K 67/00* | (2006.01) | |
| *B29L 23/00* | (2006.01) | |
| *B29L 31/00* | (2006.01) | |

(52) U.S. Cl.
CPC .......... *B32B 27/08* (2013.01); *B29C 48/0018* (2019.02); *B29C 48/022* (2019.02); *B29C 48/10* (2019.02); *B29C 48/151* (2019.02); *B29C 48/18* (2019.02); *B29C 48/21* (2019.02); *B29C 48/337* (2019.02); *B29C 48/912* (2019.02); *B29C 48/913* (2019.02); *B29C 48/92* (2019.02); *B32B 1/08* (2013.01); *B32B 7/028* (2019.01); *B32B 27/304* (2013.01); *B32B 27/32* (2013.01); *B32B 27/36* (2013.01); *B65D 65/40* (2013.01); *B29C 2948/92704* (2019.02); *B29C 2948/92923* (2019.02); *B29K 2023/04* (2013.01); *B29K 2027/08* (2013.01); *B29K 2067/00* (2013.01); *B29K 2995/0049* (2013.01); *B29K 2995/0063* (2013.01); *B29K 2995/0097* (2013.01); *B29L 2023/001* (2013.01); *B29L 2031/712* (2013.01); *B32B 2250/05* (2013.01); *B32B 2250/24* (2013.01); *B32B 2270/00* (2013.01); *B32B 2307/31* (2013.01); *B32B 2307/518* (2013.01); *B32B 2307/72* (2013.01); *B32B 2307/7242* (2013.01); *B32B 2307/736* (2013.01); *B32B 2439/70* (2013.01); *B32B 2597/00* (2013.01)

(58) Field of Classification Search
CPC .......... B32B 27/08; B32B 7/028; B32B 1/08; B32B 27/304; B32B 27/32; B32B 27/36; B32B 2250/05; B32B 2250/24; B32B 2270/00; B32B 2307/31; B32B 2307/518; B32B 2307/72; B32B 2307/7242; B32B 2307/736; B32B 2439/70; B32B 2597/00; B29C 2948/92704; B29C 2948/92923; B29C 48/022; B29C 48/10; B29C 48/18; B29C 48/0018; B29C 48/151; B29C 48/912; B29C 48/21; B29C 48/337; B29C 48/913; B29C 48/92; B65D 65/40; B29K 2023/04; B29K 2027/08; B29K 2067/00; B29K 2995/0049; B29K 2995/0063; B29K 2995/0097; B29K 2023/001; B29K 2031/712; B29L 2023/001; B29L 2031/712

See application file for complete search history.

(56) References Cited

U.S. PATENT DOCUMENTS

| | | |
|---|---|---|
| 3,891,008 A | 6/1975 | D'Entremont |
| 4,302,565 A | 11/1981 | Goeke et al. |
| 4,302,566 A | 11/1981 | Karol et al. |
| 4,589,247 A | 5/1986 | Tsuruta et al. |
| 5,026,798 A | 6/1991 | Canich |
| 5,406,763 A | 4/1995 | Al-Saleh |

(Continued)

FOREIGN PATENT DOCUMENTS

| | | |
|---|---|---|
| EP | 1563990 | 8/2005 |
| EP | 2077239 | 7/2009 |

(Continued)

*Primary Examiner* — Michael C Miggins
(74) *Attorney, Agent, or Firm* — Jason R. Womer

(57) ABSTRACT

The present invention provides a multilayer packaging film characterized by an improved sealability even through contamination with excellent shrinkability good optics and strength without using internal layers of stiff resins and cross-linking, to flexible containers made therefrom, such as bags, pouches and the like, useful for packaging articles, in particular food items.

15 Claims, No Drawings

(56) References Cited

U.S. PATENT DOCUMENTS

| | | |
|---|---|---|
| 6,790,468 B1 | 9/2004 | Mize et al. |
| 7,193,017 B2 | 3/2007 | Kwalk |
| 2006/0115613 A1 | 6/2006 | Dawe et al. |
| 2007/0031691 A1 | 2/2007 | Forloni et al. |

FOREIGN PATENT DOCUMENTS

| | | |
|---|---|---|
| EP | 2737999 | 6/2014 |
| WO | 0198081 | 12/2001 |
| WO | 2012076481 | 6/2012 |
| WO | 2015181333 | 5/2014 |
| WO | 2015107127 | 7/2015 |
| WO | 2015187173 | 12/2015 |

MULTILAYER NON-CROSS-LINKED HEAT-SHRINKABLE PACKAGING FILMS

TECHNICAL FIELD

The present invention relates to multilayer barrier non cross-linked heat shrinkable packaging films and to flexible containers made therefrom, such as bags, pouches and the like, useful for packaging articles, in particular food items.

BACKGROUND ART

Multilayer barrier heat shrinkable packaging films have been used for the packaging of a variety of products. Heat shrinkable barrier films are very commonly converted into bags for packaging fresh or processed (i.e., cooked) food products.

A barrier bag protects a food product (e.g., meat) from spoilage and contamination and prevents leakage of the packaged product's juice or liquid. The barrier bag may also display printed information regarding the packaged product. The barrier bag is sealed and usually heat shrunk tightly around the product.

Accordingly, the thermoplastic film from which the barrier bag is made (i.e., the "barrier bag film") is heat shrinkable, possibly having a high total free shrink. Further, the barrier bag film is preferably capable of quickly forming a heat seal that will hold at or below the heat shrinking temperature. The barrier bag film also presents pleasing optical characteristics (i.e., high gloss and low haze).

Through the years, several efforts have been done in the technical field to improve the appearance and performance of the final package by optimizing shrink, optical, mechanical and sealability properties of the films used in these packages.

Concerning the shrinking properties, an ideal packaging film should have the correct balance of free shrink, maximum shrink tension and residual shrink tension in order to provide taut packages with an appealing appearance and a satisfactory functionality, which have to be preserved under the most common packaging and storage conditions and over time for the entire package life.

This is particularly true for the vacuum packaging of meat products, particularly fresh meat products. Upon evacuating the atmosphere from the package followed by heat-sealing of the film, the resulting closed package should tightly shrink around the meat product. A film endowed with a sufficiently high free shrink retracts against the product, reducing the excess of film protruding away from the packaged product and improving the appearance and the function of the package. Further, a film with an appropriate residual shrink tension, which is measured at typical fridge temperatures, can avoid package relaxation.

As known to the person skilled in the field of shrinkable films, heat shrinkability is a property conferred through orientation of the intermediate tape or tube. The temperature and the entity of the shrink is influenced by tape features (e.g. number, thickness, position, resins and possible cross-linking of the layers), by orientation equipment and by process conditions (e.g. bubble or flat orientation, simultaneous or sequential drawing, temperatures, draw ratios, etc.). It is desirable that a film is easily orientable and obtainable in a stable and controlled way, namely that the film is endowed with a good processability. Other important requirements of the package, for the consumer perception, are the optical properties, namely its transparency and its gloss. The transparency allows the consumer to "see through" the package and inspect the product and, additionally, a glossy package is undoubtedly more attractive. Particularly in the case of barrier shrink films, where the barrier layer is for example EVOH or PVDC, the wrinkling of the barrier layer due to the shrink, may cause a significant worsening of the optics of the film, which results less transparent and hazed. For these reasons, it is crucial to preserve the optical properties of the film also after shrink, especially in the case of highly shrinking barrier films.

Mechanical properties of packaging films are also very important during manufacturing, converting and packaging operations as well as for the whole shelf-life of the package.

In particular, during manufacturing of the film, certain mechanics are generally required in order to be able to orient the intermediate structure (tape or tube) without breaking or bursting, especially under high draw ratios and/or low orientation temperatures.

Mechanical properties are also crucial for a successful manufacturing of the packages.

Generally, films that are more rigid show better machinability and converting performances, namely they are more suitable to be used in certain packaging cycles, allowing higher speeds and less rejects. A film having a certain stiffness is, in fact, less subject to creasing, folding, jamming, seal pleats, edge curls formation and, in general, can be more easily used with any kind of packaging machine.

More stiff films provide for flexible containers easier to be loaded with the product, as they stand open during loading.

Further, mechanical properties also play a role at packaging level as stiff films result in packages with improved impact resistance and less openings or ruptures (leakers), which may accidentally occur during the packaging process or the handling of the packages.

Packages made of films with certain mechanics are easily openable, as upon pulling, the initial tear propagates smoothly, thus allowing the package opening without using scissors or knives.

Finally, films that are more rigid show better printability as generally they do not wrinkle.

Another relevant property of packaging films required for manufacturing hermetic packages is sealability. It is highly desirable to provide films with good sealing characteristics, in particular high seal strength, especially films capable of sealing even if the sealing surface is contaminated for instance by dust, fat, water or blood. Contamination of the sealing surface is a drawback that frequently occurs when the packaged products—in particular fresh food such as fresh fish or meat—release fluids that soil the sealing area and weaken the seal, with possible failure and loss of hermeticity of the package.

Another desirable seal-related property of packaging films is the so called "stack-sealability" namely the possibility that the bags can be suitably heat-sealed in the sealing chamber even if overlapped, without problems of insufficient seal strength and/or sealing or sticking to each others of the outer abuse layers. Multilayer packaging films endowed with one or more of the above desired properties are known.

For instance, the document WO2012076481A1 in the name of Cryovac describes multilayer cross-linked barrier heat shrinkable packaging films comprising a polyolefin based outer layer and internal layer(s) made of blends of polyethylene(s) and acrylates.

The document WO2015107127A1 in the name of Cryovac shows multilayer cross-linked barrier heat shrinkable packaging films comprising a polyester based outer layer, preferably internal polyamide based layer(s) and internal conventional tie and core layers.

The document EP2077239A1 in the name of Flexopack describes a multilayer cross-linked barrier heat shrinkable packaging films comprising a polyester based outer layer and internal conventional core layers.

The document U.S. Pat. No. 6,406,763 in the name of Cryovac relates to multilayer preferably cross-linked barrier heat shrinkable packaging films comprising an outer layer based on polyester(s), ethylene-alpha—olefin copolymers or styrene-butadiene block copolymers, preferably no internal layers comprising stiff resins and internal conventional core layers.

The document EP2737999A1 in the name of Flexopack, describes multilayer preferably cross-linked barrier heat shrinkable packaging films comprising an outer layer possibly based on polyester(s), at least one internal polyamide layer and internal conventional tie layers.

The document WO2015181333A1 in the name of Cryovac shows multilayer non-cross-linked barrier heat shrinkable packaging films comprising an outer layer preferably based on polyester(s), preferably at least one internal polyamide layer and internal tie layers made of blends of conventional adhesives (modified ethylene-alpha-olefin copolymers and modified EVA).

The document WO0198081A1 in the name of Kureha discloses multilayer non-cross-linked barrier heat shrinkable packaging films comprising an outer layer preferably based on polyester(s), at least one internal polyamide layer and internal conventional tie layers.

The document EP1651438A1 in the name of Cryovac shows multilayer non-cross-linked barrier high modulus heat shrinkable barrier packaging films, comprising a thick outer polyester layer, internal conventional tie layers or a single polyolefin layer, no internal layers comprising polyamides or polyesters.

These films were oriented with a simultaneous tenter-frame at temperatures of about 110-120° C. and were optionally annealed, so at 85° C. they would not shrink enough to get the required tightness of the package. In the art of packaging films, different solutions to impart stiffness have been applied, alone or in combination such as, for instance, increasing film thickness, incorporating high amount of stiff resins such as polyamides or polyesters or polystyrenes, or cross-linking the structure. However, these strategies may have negative consequences on film manufacturing and properties in terms of overall process efficiency and costs, in particular of scarce orientability of the tape, low shrink, bad optics and unsatisfactory sealability of the film.

In particular, in case of shrinkable films, it has been observed that an increase in stiffness often results in too low free shrinking properties and in worsened optical characteristics (e.g., gloss, haze before and after shrink).

The addition of abuse resistant resins, herein also named as "stiff resins", in particular of high melting point polymers, such as polyamides or particularly aromatic polyesters, resulted in further issues.

First, when these films incorporate a barrier layer comprising PVDC, the different thermal behaviour and stability of the barrier polymers with respect to the abuse resistant resins, make the manufacturing process of the film difficult. Conventional processes with traditional extrusion dies may cause so much damage of the PVDC layer that the final film would not be acceptable in terms of colour, oxygen transmission and/or optics.

Additionally, for complex film formulations comprising barrier layers (for example EVOH or PVDC) and some layers of stiff resins, such as polyesters and polyamides, the set-up of the extrusion process is more critical and requires several line adjustments before finding a good compromise between process yield and film properties. Furthermore, formulations including polyamide layers are often affected by problems of bond strength between the various layers and by wrinkle formation, which is detrimental to printing. Finally, stiff resins, especially polyamides, are rather expensive.

Regarding cross-linking, in addition to complicating the manufacturing process, it generally worsens the weldability of the films, especially through contamination.

In conclusion, there is still the need for new multilayer barrier highly shrinkable packaging films that do not include internal layers of polyamide(s) and polyester(s) but which are nonetheless endowed with good process stability, good optical properties, especially after shrink, excellent sealability, even through contamination, appropriate abuse resistance and tearability, and that can be manufactured with conventional equipment.

SUMMARY OF INVENTION

The Applicant wished to improve the weldability, particularly through contamination, to increase the free shrink and possibly, at the same time, minimize the internal content of rigid resins such as polyamide and polyesters in conventional multilayer barrier packaging films.

A possibility to make more easily weldable the resins of the sealant layer of multilayer structures was to avoid crosslinking during their production.

However, the simultaneous absence of crosslinking and of significant amounts of rigid resins within these films caused a deterioration of the mechanical properties that rendered the manufacture and the use of these structures in conventional packaging applications very troublesome.

The Applicant has surprisingly found that it is possible to avoid both the crosslinking and the incorporation of rigid resins in multilayer barrier films for packaging, and to maintain at the same time good mechanical performance, thanks to the presence of internal layers of specific thickness and composition.

In particular, the Applicant has found that internal core layers—of selected composition, thickness and position—inserted in conventional non-cross-linked multilayer barrier packaging films including a sealant layer, a barrier layer, a polyester outer layer and no internal layers made of stiff resins, surprisingly provides for tapes which are highly stretchable and stable at orientation and which result in films with very high free shrink, good bond among the adjacent layers, excellent sealability also through contamination, good optical properties, even after shrink, and mechanical strength suitable for conventional packaging applications.

The peculiar content, in particular the selection of specific polyethylene components and blends, the thickness and the proper disposition of the core layers in said multilayer barrier films allow to avoid cross-linking of the tape and inclusion of significant amount of stiff resins, thus simplifying the manufacturing process and reducing the costs. Additionally said internal core layers contribute to preserve the PVDC barrier layer, if present, from thermal degradation during processing.

The resulting films, even if asymmetric, are endowed with negligible curling and are stiff enough to perform well, in particular they are adequate to be run on any conventional bag making machines as well as to be easily printed.

The heat-shrinkable multi-layer films according to the present invention are suitable for use as food packaging materials and most suitable for, particularly, shrink packaging of fresh meat, cheese, fish, ham, sausage, various processed meats and the like. The heat-shrinkable multi-layer films according to the present invention can be converted in any suitable form according to intended packaging forms such as bags and tubes.

It is thus a first object of the present invention a multilayer heat-shrinkable non-cross-linked packaging film comprising at least:
  an outer sealant layer (a),
  an outer polyester layer (b),
  an inner gas barrier layer (c),
  a first core layer (d1) positioned between the sealant layer (a) and the gas barrier layer (c),
  a second core layer (d2) positioned between the gas barrier layer (c) and the outer polyester layer (b), and
  no inner layer comprising a major proportion of polyamide(s) or polyester(s), characterized in that
  the core layer(s) (d1) and/or (d2) independently comprise a major proportion of (I) a blend (B) of a polyethylene component (e1) not having a bimodal molecular weight distribution and of a second resin (R) selected from ethylene-vinyl acetate copolymer(s) (R1), acrylic acid copolymer(s) (R2), acrylate copolymer(s) (R3) and their admixtures,
  wherein said polyethylene component (e1) is present in amount of at least 40% by weight and said second resin (R) is present in an amount of from 10% to 60% by weight in respect of the blend (B) weight, or
  (II) a polyethylene component (e2) having a bimodal molecular weight distribution, optionally in admixture with said second resin (R),
  the core layers (d1) and (d2) do not comprise a major proportion of tie resins,
  the percentage ratio of the total thickness of the first core layer (d1) and the second core layer (d2) in respect of the total thickness of the film (r1) is from 35% to 60%, and
  the ratio of the thickness of the first core layer (d1) in respect of the second core layer (d2) (r2) is from 0.4 to 2.2.

A second object of the present invention is a process for manufacturing a film according to the first object, which comprises at least the steps of:
  co-extruding, through a round die, a tubular substrate comprising at least
  an outer sealant layer (a),
  a first core layer (d1)
  an inner gas barrier layer (c), preferably comprising polyvinylidene chloride (PVDC);
  quenching such a tubular substrate at temperatures from 5° C. to 15° C., preferably between 7° C. and 10° C., after extrusion;
  extrusion-coating the tubular substrate with all the remaining layers, thus obtaining an non-oriented tubular film;
  quenching the non-oriented tubular film at temperatures from 5° C. to 30° C., preferably from 8° C. to 25° C.;
  heating the tubular film to a temperature which is above the Tg of all the polymeric resins composing the layers and below the melting temperature of at least one of the resins employed, preferably at a temperature lower than 100° C., preferably lower than 95° C.;
  biaxially orienting the tubular film at orientation ratios from 2 to 6 in each direction, preferably from 3 to 5 in each one of longitudinal and transverse directions,
  quenching the oriented tubular film, preferably in cold air, at a temperature from 4° C. to 30° C., preferably from 5° C. to 1° C.

A third object of the present invention is a seamless tube made of a film according to the first object wherein the heat-sealing layer is the innermost layer of the tube.

A fourth object of the present invention is a flexible container, such as a pouch or bag, obtainable by heat-sealing a film according to the first object to itself.

A fifth object of the present invention is a package comprising a film according to the first object of the present invention and a product packaged therein, preferably a food product.

Definitions

As used herein, the term "film" is inclusive of plastic web, regardless of whether it is film or sheet or tubing.

As used herein, the terms "inner layer" and "internal layer" refer to any film layer having both of its principal surfaces directly adhered to another layer of the film.

As used herein, the phrase "outer layer" or "external layer" refers to any film layer having only one of its principal surfaces directly adhered to another layer of the film.

As used herein, the phrases "sealant layer", "seal layer", "sealing layer" and "heat seal layer" refer to an outer layer involved in the sealing of the film to itself, to another layer of the same or another film, and/or to another article which is not a film.

As used herein, the words "tie layer" or "adhesive layer" refer to any inner film layer having the primary purpose of adhering two layers to each other. Tie layers may be disposed between the respective layers in case where a sufficient adhesion is not ensured between adjacent layers.

As used herein, the term "core layer" refers to inner layers that have a function other than serving as an adhesive or compatibilizer for adhering two layers to one another.

As used herein, the term "adhered" is inclusive of films which are directly adhered to one another using a heat-seal or other means, as well as films which are adhered to one another using an adhesive which is between the two films.

As used herein, the phrase "directly adhered", as applied to layers, is defined as adhesion of the subject layer to the object layer, without a tie layer, adhesive, or other layer therebetween.

In contrast, as used herein, the word "between", as applied to a layer expressed as being between two other specified layers, includes both direct adherence of the subject layer to the two other layers it is between, as well as a lack of direct adherence to either or both of the two other layers the subject layer is between, i.e. one or more additional layers can be imposed between the subject layer and one or more of the layers the subject layer is between.

As used herein, the phrases "longitudinal direction" and "machine direction", herein abbreviated "LD" or "MD", refer to a direction "along the length" of the film, i.e., in the direction of the film as the film is formed during co-extrusion.

As used herein, the phrase "transverse direction" or "crosswise direction", herein abbreviated "TD", refers to a direction across the film, perpendicular to the machine or longitudinal direction.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "co-extrusion" refers to the process of extruding two or more materials through a single die with two or more orifices arranged so that the extrudates merge and weld together into a laminar structure before chilling, i.e., quenching. Co-extrusion may be employed in film blowing and extrusion coating processes.

As used herein, the term "extrusion coating" refers to processes by which a "coating" of molten polymer(s), comprising one or more layers, is extruded onto a solid "substrate" in order to coat the substrate with the molten polymer coating to bond the substrate and the coating together, thus obtaining a complete film.

As used herein the terms "coextrusion", "coextruded", "extrusion coating" and the like are referred to processes and multilayer films which are not obtained by sole lamination, namely by gluing or welding together pre-formed webs.

As used herein, the term "orientation" refers to "solid state orientation" namely to the process of stretching of the cast film carried out at a temperature higher than the Tg (glass transition temperatures) of all the resins making up the layers of the structure and lower than the temperature at which all the layers of the structure are in the molten state. The solid-state orientation may be mono-axial, transverse or longitudinal, or, preferably, bi-axial.

As used herein, the phrases "orientation ratio", "draw ratio" and "stretching ratio" refer to the multiplication product of the extent to which the plastic film material is expanded in the two directions perpendicular to one another, i.e. the machine direction and the transverse direction. Thus, if a film has been oriented to three times its original size in the longitudinal direction (3:1) and three times its original size in the transverse direction (3:1), then the overall film has an orientation ratio of 3×3 or 9:1.

As used herein, the term "non-cross-linked" refers to a film, a tape or their parts, that have not been subjected to any cross-linking process, chemically, by irradiation or by any other cross-linking means.

Non-cross-linked films are typically characterized by a low gel content, for instance lower than 5% or 1% (when measured as described in the present experimental section)

As used herein, the term "gel content" refers to the relative extent of cross-linking within a polymeric material. Gel content is expressed as a relative percent (by weight) of the polymer having formed insoluble carbon-carbon bonds between polymers and may be determined by ASTM D-2765-01 Test Method or by the method described in the present experimental section.

As used herein the phrases "heat-shrinkable," "heat-shrink," and the like, refer to the tendency of the solid-state oriented film to shrink upon the application of heat, i.e., to contract upon being heated, such that the size of the film decreases while the film is in an unrestrained state.

As used herein the phrases "total free shrink" means the sum of the percentage of free shrink in the machine (longitudinal) direction and the percentage of free shrink in the transverse (crosswise) direction.

The total free shrink is expressed as percentage (%).

As used herein, the phrase "process stability" is interchangeable with the term "processability" and refers to the stability of the film during manufacturing, at extrusion, orientation and converting levels.

As used herein, the term "polymer" refers to the product of a polymerization reaction, and is inclusive of homopolymers, and co-polymers.

As used herein, the term "homo-polymer" refers to a polymer resulting from the polymerization of a single monomer, i.e., a polymer consisting essentially of a single type of mer, i.e., repeating unit.

As used herein, the term "co-polymer" refers to polymers formed by the polymerization reaction of at least two different monomers. For example, the term "co-polymer" includes the co-polymerization reaction product of ethylene and an alpha-olefin, such as 1-hexene. When used in generic terms the term "co-polymer" is also inclusive of, for example, ter-polymers. The term "co-polymer" is also inclusive of random co-polymers, block co-polymers, and graft co-polymers.

As used herein, the phrase "heterogeneous polymer" or "polymer obtained by heterogeneous catalysis" refers to polymerization reaction products of relatively wide variation in molecular weight and relatively wide variation in composition distribution, i.e., typical polymers prepared, for example, using conventional Ziegler-Natta catalysts, for example, metal halides activated by an organometallic catalyst, i.e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al. Heterogeneous catalyzed copolymers of ethylene and an -olefin may include linear low-density polyethylene, very low-density polyethylene and ultra low-density polyethylene. Some copolymers of this type are available from, for example, The Dow Chemical Company, of Midland, Mich., U.S.A. and sold under the trademark DOWLEX resins.

As used herein, the phrase "homogeneous polymer" or "polymer obtained by homogeneous catalysis" refers to polymerization reaction products of relatively narrow molecular weight distribution and relatively narrow composition distribution. Homogeneous polymers are structurally different from heterogeneous polymers, in that homogeneous polymers exhibit a relatively even sequencing of co-monomers within a chain, a mirroring of sequence distribution in all chains, and a similarity of length of all chains, i.e., a narrower molecular weight distribution. This term includes those homogeneous polymers prepared using metallocenes, or other single-site type catalysts, as well as those homogenous polymers that are obtained using Ziegler Natta catalysts in homogenous catalysis conditions.

The co-polymerization of ethylene and alpha-olefins under homogeneous catalysis, for example, co-polymerization with metallocene catalysis systems which include constrained geometry catalysts, i.e., monocyclopentadienyl transition-metal complexes is described in U.S. Pat. No. 5,026,798 to Canich. Homogeneous ethylene/alpha-olefin copolymers (E/AO) may include modified or unmodified ethylene/alpha-olefin copolymers having a long-chain branched (8-20 pendant carbons atoms) alpha-olefin comonomer available from The Dow Chemical Company, known as AFFINITY and ATTANE resins, TAFMER linear copolymers obtainable from the Mitsui Petrochemical Corporation of Tokyo, Japan, and modified or unmodified ethylene/-olefin copolymers having a short-chain branched (3-6 pendant carbons atoms) -olefin comonomer known as EXACT resins obtainable from ExxonMobil Chemical Company of Houston, Tex., U.S.A.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and a non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-alpha-olefin which are copolymers of ethylene with one or more -olefins (alpha-olefins) such as butene-1, hexene-1, octene-1, or the like as a comonomer, and the like, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

As used herein, the term "polyethylene component" refer to a single polyethylene or to an admixture of polyethylene(s), which are the major components of the internal core layers (d1) and (d2). In the present description, said polyethylene component has preferably a density from 0.895 to 0.915 g/cc, measured according to ASTM D792. With this expression, we mean that either the single polyethylene or the admixture of polyethylene(s) has preferably a density from 0.895 to 0.915 g/cc. In case of an admixture of polyethylene(s), the density of one or more of the polyethylene(s) composing said admixture may be outside the range of 0.895 to 0.915 g/cc, provided that the density of the admixture falls within said range.

As used herein, the term "polyethylene" refers to polyethylene homopolymers or to ethylene-alpha-olefin copolymers, namely copolymers of ethylene with one or more -olefins (alpha-olefins) such as butene-1, hexene-1, octene-1, or the like as a comonomer.

As used herein, the phrase "ethylene-alpha-olefin copolymer" refers to heterogeneous and to homogeneous polymers such as linear low density polyethylene (LLDPE) with a density usually in the range of from about 0.900 g/cc to about 0.930 g/cc, linear medium density polyethylene (LMDPE) with a density usually in the range of from about 0.930 g/cc to about 0.945 g/cc, and very low and ultra low density polyethylene (VLDPE and ULDPE) with a density lower than about 0.915 g/cc, typically in the range 0.868 to 0.915 g/cc, and such as metallocene-catalyzed EXACT™ and EXCEED™ homogeneous resins obtainable from Exxon, single-site AFFINITY™ resins obtainable from Dow, and TAFMER™ homogeneous ethylene-alpha-olefin copolymer resins obtainable from Mitsui. All these materials generally include co-polymers of ethylene with one or more co-monomers selected from ($C_4$-$C_{10}$)-alpha-olefin such as butene-1, hexene-1, octene-1, etc., in which the molecules of the copolymers comprise long chains with relatively few side chain branches or cross-linked structures.

As used herein, the term "bimodal" refers to a polymer characterized by a bimodal distribution of molecular weight.

As used herein, the phrases "an ethylene-alpha-olefin copolymer or a polyethylene component having a bimodal molecular weight distribution" and the like, refers to a polymer with at least one identifiable higher molecular weight component and at least one identifiable lower molecular weight component. In a graph in which the horizontal axis is expressed as the log of the molecular weight (Log MW) a bimodal ethylene-alpha-olefin copolymer shows at least two peaks, as displayed for instance in FIG. 1 of U.S. Pat. No. 7,193,017.

As used herein, the phrases "a polyethylene component not having a bimodal molecular weight distribution" and the like, refers to conventional polyethylene having a classical molecular weight distribution (bell curve).

As used herein the term "ionomer" refers to the products of polymerization of ethylene with an unsaturated organic acid, and optionally also with an unsaturated organic acid ($C_1$-$C_4$)-alkyl ester, partially neutralized with a mono- or divalent metal ion, such as lithium, sodium, potassium, calcium, magnesium and zinc. Typical unsaturated organic acids are acrylic acid and methacrylic acid, which are thermally stable and commercially available. Unsaturated organic acid ($C_1$-$C_4$)-alkyl esters are typically (meth)acrylate esters, e.g. methyl acrylate and isobutyl acrylate. Mixtures of more than one unsaturated organic acid comonomer and/or more than one unsaturated organic acid (C1-C4)-alkyl ester monomer can also be used in the preparation of the ionomer.

As used herein, the term "ethylene/vinyl acetate" (EVA) refers to a copolymer formed from ethylene and vinyl acetate monomers wherein the ethylene units are present in a major amount and the vinyl-acetate units are present in a minor amount. The typical amount of vinyl-acetate may range from 5% to 30%, preferably from 9% to 28%, more preferably from 12% to 20% by weight.

As used herein, the phrase "acrylic acid copolymer(s)" refers to homopolymers and copolymers obtained by polymerization of acrylic and/or methacrylic acid monomer units. These monomer units have the general formula: [$H_2C=C$](R)($CO_2H$) where R=H, alkyl group. Acrylic acid-based resins may be formed by any method known to those skilled in the art and may include polymerization of acrylic acid, or methacrylic acid in the presence of light, heat, or catalysts such as benzoyl peroxides, or by the esters of these acids, followed by saponification. Preferred acrylic acid-based resins include copolymers of ethylene and (meth)acrylic acid such as ethylene/acrylic acid copolymer (EAA), ethylene/methacrylic acid copolymer (E/MAA), and blends thereof.

As used herein, the phrase "acrylate copolymer(s)" refers to homopolymers and copolymers obtained by polymerization of acrylate monomer units. The acrylate monomer unit can be represented by the general formula: [$H_2C=C$](R)($CO_2R'$) where R=H, alkyl group and R'=same or different alkyl group as R.

Acrylate-based resins may be formed by any method known to those skilled in the art, such as, for example, polymerization of the acrylate monomer by the same methods as those described for acrylic acid-based resins. Examples of acrylate-based resin include, but are not limited to, methyl/methacrylate copolymer (MMA), ethylene/methacrylate copolymer (EMA), ethylene/butyl acrylate copolymer (EBA), and blends thereof.

As used herein, the term "tie or adhesive resin" refer to resins characterized by adhesion properties typically used in adhesive layers. Tie resins include acid or anhydride modified ethylene-alpha-olefin copolymers, acid or anhydride modified ethylene-acrylic acid copolymers (EAA), acid or anhydride modified ethylene-ethyl acrylate copolymer (EEA), acid or anhydride modified VLDPE, acid or anhydride modified LLDPE, acid or anhydride modified ionomer resins, acid or anhydride modified EVA. Examples of an acid used for acid modification include maleic acid, itaconic acid and anhydrides thereof, acrylic acid, and methacrylic acid.

As used herein, the phrase "modified polymer", as well as more specific phrases such as "modified ethylene/vinyl acetate copolymer", "modified polyolefin" and "modified ethylene-alpha-olefin copolymer" refer to such polymers having an anhydride functionality, as defined immediately above, grafted thereon and/or copolymerized therewith.

As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer or copolymerized with a polymer and is also inclusive of derivatives of such functionalities, such as acids, esters, and metal salts derived therefrom.

As used herein, the phrase "anhydride-containing polymer" and "anhydride-modified polymer" refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the term "polyamide" refers to high molecular weight polymers having amide linkages along the molecular chain, and refers more specifically to synthetic polyamides such as nylons. Such term encompasses both homo-polyamides and co-(or ter-) polyamides. It also specifically includes aliphatic polyamides or co-polyamides, aromatic polyamides or co-polyamides, and partially aromatic polyamides or co-polyamides, modifications thereof and blends thereof. The homo-polyamides are derived from the polymerization of a single type of monomer comprising both the chemical functions, which are typical of polyamides, i.e. amino and acid groups, such monomers being typically lactams or aminoacids, or from the polycondensation of two types of polyfunctional monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side. Exemplary polymers are polyamide 6, polyamide 6/9, polyamide 6/10, polyamide 6/12, polyamide 11, polyamide 12, polyamide 6/12, polyamide 6/66, polyamide 66/6/10, modifications thereof and blends thereof. Said term also includes crystalline or partially crystalline, aromatic or partially aromatic polyamides.

As used herein, the term "polyester" refers to both homo- and co polyesters, wherein homo-polyester are defined as polymers obtained from the condensation of a lactone or of one dicarboxylic acid with one diol and co-polyesters are defined as polymers obtained from the condensation more than one lactone or of one or more dicarboxylic acids with one or more diols.

As used herein, the term "gas-barrier" when referred to a layer, to a resin contained in said layer, or to an overall structure, refers to the property of the layer, resin or structure, to limit to a certain extent passage through itself of gases.

When referred to a layer or to an overall structure, the term "gas-barrier" is used herein to identify layers or structures characterized by an Oxygen Transmission Rate (evaluated at 23° C. and 0% R.H. according to ASTM D-3985) of less than 500 cc/ m$^2$·day·atm, preferably lower than 100 cc/ m$^2$·day·atm, even more preferably lower than 50 cc/ m$^2$·day·atm.

As used herein, the phrase "flexible container" is inclusive of pouches, obtainable for instance with Horizontal or Vertical form-fill-seal machines, end-seal bags, side-seal bags, L-seal bags, U-seal bags, gusseted bags, back-seamed tubings, and seamless casings.

As used herein, the phrase "a seamless tube" relates to a tube devoid of any seal, which is generally made of a multilayer film (co)extruded through a round die, wherein the heat-sealing layer (a) is the innermost layer of the tube.

As used herein, the term "package" is inclusive of packages made from such containers or tubes, by placing a product in the article and sealing the article so that the product is substantially surrounded by the heat-shrinkable multilayer film from which the packaging container is made.

In particular, the term "package" is inclusive of all of the various components used in the packaging of a product, i.e., all components of the packaged product other than the product within the package. The package is inclusive of, for example, a rigid support member, all films used to surround the product and/or the rigid support member, an absorbent component such as a pad, and even the atmosphere within the package, together with any additional components used in the packaging of the product As used herein, the term "bag" refers to a packaging container having an open top, side edges, and a bottom edge. The term "bag" encompasses lay-flat bags, pouches, casings (seamless casings and back-seamed casings, including lap-sealed casings, fin-sealed casings, and butt-sealed back-seamed casings having back-seaming tape thereon). Various casing configurations are disclosed in U.S. Pat. No. 6,764, 729 and various bag configurations, including L-seal bags, back-seamed bags, and U-seal bags (also referred to as pouches), are disclosed in U.S. Pat. No. 6,790,468.

As used herein the terms "major proportion" and "minor proportion" when referred to a resin as a component of a layer, refer to an amount respectively higher than 50 wt. % or lower than 50 wt. % of said resin calculated on the overall weight of the layer.

As used herein, the terms "sealant layer", "gas-barrier layer" or "polyester layer" refer to layers comprising a major proportion of sealant, gas-barrier or polyester resins respectively.

Unless otherwise stated, all the percentages are meant to be percentages by weight.

DETAILED DESCRIPTION OF THE INVENTION

A first object of the present invention a multilayer heat-shrinkable non-cross-linked packaging film comprising at least:
  an outer sealant layer (a),
  an outer polyester layer (b),
  an inner gas barrier layer (c),
  a first core layer (d1) positioned between the sealant layer (a) and the gas barrier layer (c),
  a second core layer (d2) positioned between the gas barrier layer (c) and the outer polyester layer (b), and
  no inner layer comprising a major proportion of polyamide(s) or polyester(s), characterized in that
  the core layer(s) (d1) and/or (d2) independently comprise a major proportion of
  (I) a blend (B) of a polyethylene component (e1) not having a bimodal molecular weight distribution and of a second resin (R) selected from ethylene-vinyl acetate copolymer(s) (R1), acrylic acid copolymer(s)
  (R2), acrylate copolymer(s) (R3) and their admixtures,
  wherein said polyethylene component (e1) is present in amount of at least 40% by weight and said second resin (R)

is present in an amount of from 10% to 60% by weight in respect of the blend (B) weight, or (II) a polyethylene component (e2) having a bimodal molecular weight distribution, optionally in admixture with said second resin (R), the core layers (d1) and (d2) do not comprise a major proportion of tie resins, the percentage ratio of the total thickness of the first core layer (d1) and the second core layer (d2) in respect of the total thickness of the film (r1) is from 35% to 60%, and the ratio of the thickness of the first core layer (d1) in respect of the second core layer (d2) (r2) is from 0.4 to 2.2.

The present film is characterized by one or more of the present features, taken alone or in combination.

The films according to the first object of the present invention comprise an outer sealant layer (a).

The heat-sealable layer (a) typically comprise one or more polymers selected among ethylene-vinyl acetate copolymers (EVA), homogeneous or heterogeneous linear ethylene-alpha-olefin copolymers, polypropylene copolymers (PP), ethylene-propylene copolymers (EPC), ionomers, and blends of two or more of these resins.

Particularly preferred polymer, for the heat sealable layer (a), are heterogeneous materials as linear low density polyethylene (LLDPE) with a density usually in the range of from about 0.910 g/cc to about 0.930 g/cc, linear medium density polyethylene (LMDPE) with a density usually in the range of from about 0.930 g/cc to about 0.945 g/cc, and very low and ultra low density polyethylene (VLDPE and ULDPE) with a density lower than about 0.915 g/cc; and homogeneous polymers such as metallocene-catalyzed EXACT™ and EXCEED™ homogeneous resins obtainable from Exxon, single-site AFFINITY™ resins obtainable from Dow, QUEO by Borealis, TAFMER™ homogeneous ethylene-alpha-olefin copolymer resins obtainable from Mitsui. All these materials generally include co-polymers of ethylene with one or more co-monomers selected from (C4-C10)-alpha-olefin such as butene-1, hexene-1, octene-1, etc., in which the molecules of the copolymers comprise long chains with relatively few side chain branches or cross-linked structures.

These polymers can be advantageously blended in various percentages to tailor the sealing properties of the films depending on their use in packaging, as well known by those skilled in the art.

Blends comprising VLDPE polymers, for example AFFINITY PL 1281G1, AFFINITY PL 1845G, AFFINITY PL 1280G by DOW or QUEO 1007 by Borealis are particularly preferred.

In the most preferred embodiment, the sealing layer consists of a blend of two VLDPE resins.

In general, the preferred resins for the heat sealable layer (a) have a seal initiation temperature lower than 110° C., more preferably a seal initiation temperature lower than 105° C., and yet more preferably a sealing initiation temperature lower than 100° C.

The heat-sealable layer (a) of the film of the present invention can have a typical thickness comprised within the range from 2 to 35 microns, preferably from 3 to 30 microns, from 4 to 25 microns, from 6 to 15 microns.

Preferably, the percentage by weight of the heat sealable layer (a) into the whole film is in the range of from 5 to 35%, more preferably from 7 to 30%, even more preferably from 10 to 25%.

The films according to the first object of the present invention comprise an outer polyester layer (b).

The outer layer (b) provides for strength (anti-abuse) and heat-resistance during the sealing step.

It comprises one or more polyester(s) having melting point higher than the melting point of polymers in the heat sealant layer (a), preferably higher than 180° C., 190° C., 200° C., 220° C. and even 240° C.

Such a difference in melting points of the polyester resins of layer (b) in respect of the sealant resins of layer (a) provides for films with excellent stack sealability.

Polyester(s) refer to homopolymers or copolymers having an ester linkage between monomer units, which may be formed, for example, by condensation polymerization reactions between a dicarboxylic acid and a glycol. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, e.g., various isomers of phthalic acid (i.e., ortho-phthalic acid), such as isophthalic acid (i.e., meta-phthalic acid), and terephthalic acid (i.e., para-phthalic acid), as well as naphthalic acid. Specific examples of alkyl substituted aromatic acids—herein also called aromatic polyesters—include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The dicarboxylic acid can alternatively be 2,5-furandicarboxylic acid (FDCA). The glycols may be straight-chained or branched. Specific examples include ethylene glycol, propylene glycol, trimethylene glycol, 1,4-butane diol, neopentyl glycol and the like. The glycols include modified glycols such as 1,4 cyclohexane dimethanol.

Suitable polyesters include poly(ethylene 2,6-naphtalate), poly(butylene terephthalate), poly(ethylene terephthalate), and copolyesters obtained by reacting one or more dicarboxylic acids with one or more dihydroxy alcohols, such as PETG which is an amorphous co-polyesters of terephthalic acid with ethylene glycol and 1,4-cyclohexanedimethanol.

The outer polyester layer (b) may comprise one or more polyesters, preferably, one or more aromatic polyesters.

Preferably the polyester is an aromatic polyester, preferably selected from poly(ethylene 2,6-naphtalate), poly(butylene terephthalate), poly(ethylene terephthalate), copolyesters obtained by reacting one or more aromatic dicarboxylic acids with one or more dihydroxy alcohols, (such as PETG) and their admixtures, more preferably is poly(ethylene terephthalate) and copolymers thereof.

Preferred polyesters are polyesters of ethylene glycol and terephthalic acid such poly(ethylene terephthalate) (PET). Preference is given to polyesters, which contain ethylene units and include, based on the dicarboxylate units, at least 90 mol %, more preferably at least 95 mol %, of terephthalate units. Particularly preferred polyesters are PETs supplied by Artenius or Ramapet by Indorama or Eastman polyester resins.

The polyester-containing layer(s) may comprise any of the above polyester either alone or in blend.

In the preferred embodiment, the polyester layer consists of a single polyester resin, particularly preferred are PETs Ramapet N180, Ramapet W170 and PolyClear PET 5704 by Indorama, Hytrel 5553FG NC010 by DuPont or ATMER 7540 by Croda.

Preferably, the percentage by weight of the polyester(s) of the outer layer (b) in respect of the whole film weight is between at least 3%, 5%, 7% and at most 15%, 12%, 10%.

Preferably, in the film of the invention, the polyester is only present in the outer layer (b).

Preferably, the percentage by weight of the polyester(s) in the outer polyester layer (b) is higher than 50%, 70%, 90%, 95%, more preferably higher than 98%, most preferably it substantially consists of polyester(s).

The polyester-comprising layer(s) may have a typical thickness of at least 1.5, at least 2.0, at least 2.5, at least 3 microns and of at most 10, at most 7, at most 5 microns.

Preferably, the percentage ratio of the thickness of the outer polyester layer (b) in respect of the total thickness of the film (r3) is from 3% to 15%, preferably from 5% to 10%, more preferably from 6% to 7%.

Preferably, (r3) is lower than 10%, more preferably lower than 7%.

Preferably, the polyester(s) of the outer layer (b) has an intrinsic viscosity IV not higher than 0.80 MPa·sec, preferably lower than 0.75 MPa·sec, more preferably lower than 0.72 MPa·sec, measured according to ASTM D4603-03.

As used herein, the intrinsic viscosity is defined as the limiting value of the reduced viscosity at infinite dilution of the polymer and is determined using a capillary viscometer. A suitable method for the determination of the intrinsic viscosity is for instance ASTM method D4603-03.

Mixtures or blends of homo- and/or co-polyesters can be used for the outer layer (b), provided that preferably the polyester having an intrinsic viscosity lower than 0.75 MPa·sec represents the major proportion of the base layer.

The film according to the first object of the present invention comprises an inner gas barrier layer (c).

The inner gas barrier layer (c) of the film of the present invention may comprise high oxygen barrier materials having an oxygen permeability, lower than 100 $cm^3$ $O_2/m^2$—day—atmosphere (evaluated at 23° C. and 0% relative humidity, per ASTM D-3985), more preferably lower than 80 or 50 and most preferably lower than 25, than 10, than 5 and even lower than 1 $cm^3$ $O_2/m^2$—day—atmosphere.

Preferably, the inner gas barrier layer (c) comprises at least one gas barrier polymer selected among polyvinylidene chloride polymers (PVDC), vinylidene chloride/methyl acrylate copolymers, ethylene-vinyl alcohol copolymers (EVOH), polyamides, acrylonitrile-based copolymers, polyesters and blends thereof, more preferably selected among polyvinylidene chloride polymers (PVDC) and vinylidene chloride/ methyl acrylate copolymers or their blends.

Preferably, the inner gas barrier layer (c) comprises at least 80%, 90% 95% of one or more of the gas barrier polymers listed above.

Preferably, the film of the present invention comprise an internal oxygen barrier layer (c) comprising polyvinylidene chloride (PVDC).

Preferably, the PVDC resin comprises a thermal stabilizer (i.e., HCI scavenger, e.g., epoxidized soybean oil) and a lubricating processing aid, which, for example, comprises one or more acrylates.

The term PVDC includes copolymers of vinylidene chloride and at least one mono-ethylenically unsaturated monomer copolymerizable with vinylidene chloride. The mono-ethylenically unsaturated monomer may be used in a proportion of 2-40 wt. %, preferably 4-35 wt. %, of the resultant PVDC. Examples of the mono-ethylenically unsaturated monomer may include vinyl chloride, vinyl acetate, vinyl propionate, alkyl acrylates, alkyl methacrylates, acrylic acid, methacrylic acid, and acrylonitrile. The vinylidene chloride copolymer can also be a ter-polymer. It is particularly preferred to use a copolymer with vinyl chloride or (C1-C8)-alkyl (meth)acrylate, such as methyl acrylate, ethyl acrylate or methyl methacrylate, as the comonomers. It is also possible to use a blend of different PVDC such as for instance a blend of the copolymer of vinylidene chloride with vinyl chloride with the copolymer of vinylidene chloride with methyl acrylate. Blends of PVDC and polycaprolactone (as those described in patent EP2064056 B1, example 1 to 7) are also possible and particularly useful for respiring food products such as some cheeses.

In such a case, the multilayer heat-shrinkable film, which is object of the present invention, can exhibit an oxygen transmission rate (OTR) ranging from 120 to 450, more preferably from 180 to 450 cc/m2 day atm at 23° C. and 0% relative humidity (ASTM D-3985).

The PVDC may contain suitable additives as known in the art, i.e. stabilisers, antioxidizers, plasticizers, hydrochloric acid scavengers, etc. that may be added for processing reasons or/and to control the gas-barrier properties of the resin. Particularly preferred PVDC is IXAN PV910 supplied by Solvin and SARAN 806 by Dow.

Preferably, the gas barrier layer (c) comprises at least 85% of PVDC, more preferably at least 90%, even more preferably at least 95%. In the most preferred embodiment, the barrier layer (b) consists of PVDC.

The gas barrier layer (c) has typically a thickness from 0.1 to 30 microns, preferably 0.2 to 20 microns, more preferably from 0.5 to 10 microns, even more preferably from 1 to 8 microns.

The films of the present invention are typically high barrier films, showing an OTR (evaluated at 23° C. and 0% R.H. according to ASTM D-3985) below 100 cc/m2·day·atm and preferably below 80 cc/m2·day·atm and will be particularly suitable for meat packaging, including fresh red meat and processed meat.

The film of the present invention comprises a first core layer (d1) positioned between the sealant layer (a) and the gas barrier layer (c) and a second core layer (d2) positioned between the gas barrier layer (c) and the outer polyester layer (b).

The first and the second core layers (d1) and (d2) may have the same or a different composition. Preferably, they have the same composition.

In the present films, each one of the core layers (d1) and (d2) comprises independently a major proportion of a blend (B) as defined herein below, preferably more than 60%, 70%, 80%, 90%, 95%, more preferably higher than 98% by weight with respect to layer (d1) or (d2) weight, most preferably they substantially consist of the blend (B) or of the polyethylene component (e2).

The core layers (d1) and (d2) do not comprise a major proportion of tie resins, preferably, they do not comprise more than 30%, 20%, 10%, 5%, 1% of tie resins, most preferably they do not contain any tie resin. Tie resins include acid or anhydride modified ethylene-alpha-olefin copolymers, acid or anhydride modified ethylene-vinyl-acetate copolymers, acid or anhydride modified acrylic acid copolymers and acid or anhydride modified acrylate copolymers.

In a preferred embodiment, the core layers (d1) and (d2) comprises independently a major proportion of a blend (B), more preferably they consist of blend (B).

The blend (B) comprises a polyethylene component (e1) in amount of at least 40% by weight and from 15% to 60% by weight in respect of the blend (B) weight of a second resin (R) selected from ethylene-vinyl acetate copolymer(s) (R1), acrylic acid copolymer(s) (R2), acrylate copolymer(s) (R3) and their admixtures.

The polyethylene component (e1) is a polyethylene homopolymer or an ethylene-alpha-olefin copolymer or an admixture thereof, preferably having a density from 0.895 to 0.915 g/cc, more preferably from 0.900 g/cc to 0.910 g/cc or from 0.902 to 0.905 g/cc, typically measured according to ASTM D792. In case of an admixture, said density is referred to the admixture.

Preferably, the blend (B) comprises a major proportion of said polyethylene component (e1), preferably comprises from 50% to 90%, from 55% to 85% by weight of said polyethylene component (e1) with respect to the blend weight.

Preferably, the blend (B) comprises from 50% to 90%, from 55% to 85% by weight of said polyethylene component (e1) and from 50% to 10%, preferably from 45% to 15% of the second resin (R) with respect to the blend weight.

Preferably, the blend (B) consist of from 50% to 90%, from 55% to 85% by weight of said polyethylene component (e1) and from 50% to 10%, preferably from 45% to 15% of the second resin (R) with respect to the blend weight Suitable polyethylene components (e1) are for instance AFFINITY PL 1880G, AFFINITY PL 1845G, ATTANE SL 4102G by DOW.

The second resin (R) comprised in the blend (B) is selected from ethylene-vinyl acetate copolymer(s) (R1), acrylic acid copolymer(s) (R2), acrylate copolymer(s) (R3) and their admixtures.

Preferred ethylene-vinyl acetate copolymer(s) (R1) include copolymers formed from ethylene and vinyl acetate monomers wherein the vinyl acetate content preferably ranges from 5% to 30%, preferably from 9% to 28%, more preferably from 12% to 20% by weight.

Preferred acrylic acid-based (R2) resins include copolymers of ethylene and (meth)acrylic acid such as ethylene/acrylic acid copolymer (EAA), ethylene/methacrylic acid copolymer (E/MAA), and blends thereof.

Preferred acrylate-based (R3) resins include, but are not limited to, methyl/methacrylate copolymer (MMA), ethylene/methacrylate copolymer (EMA), ethylene/butyl acrylate copolymer (EBA), and blends thereof.

Suitable second resin (R)s are for instance LOTRYL 17BA04 by Arkema, ELVALOY AC 1218, NUCREL 1202, Surlyn 1650, ELVAX 3165 by DuPont, ESCORENE ULTRA FL00119, ESCORENE FL 00212, Escorene Ultra LD 761.36 by ExxonMobil, 1003 VN 4 by Total Petrochemicals and EB524AA by Westlake Chemical.

The second resin (R) is present in the blend (B) in amount of at least 15% by weight, preferably from 15% to 60% by weight, more preferably from 30% to 40% by weight with respect to the blend weight.

Preferably, both the core layers (d1) and (d2) include a major proportion of the same blend (B).

Preferably, independently, the core layers (d1) and (d2) include the blend (B) in amount higher than 60%, 70%, 90%, 95%, more preferably higher than 98% by weight with respect to the core layer weight, most preferably they substantially consist of blend (B).

Preferably, both the core layers (d1) and (d2) include the blend (B) in amount higher than 60%, 70%, 90%, 95%, more preferably higher than 98%, by weight with respect to the core layer weight, most preferably they substantially consist of blend (B).

Preferably, both the core layers (d1) and (d2) include the same blend (B) in amount higher than 95% by weight with respect to the core layers weight.

Preferably, the blend (B) comprises a major proportion, preferably comprises from 50% to 90%, from 55% to 85% by weight of said polyethylene component (e1) and/or at least 15% by weight, preferably from 15% to 60% by weight, more preferably from 30% to 40% by weight of said second resin (R) with respect to the blend (B) weigh.

Preferably, the blend (B) consist of a major proportion, preferably comprises from 50% to 90%, from 55% to 85% by weight of said polyethylene component (e1) and/or at least 15% by weight, preferably from 15% to 60% by weight, more preferably from 30% to 40% by weight of said second resin (R) with respect to the blend (B) weigh.

Preferably, the blend (B) consists of a polyethylene component (e1) and a second resin (R) selected from ethylene-vinyl acetate copolymer(s) (R1), acrylic acid copolymer(s) (R2), acrylate copolymer(s) (R3) and their admixtures, in which said second resin (R) is present in amount of at least 15% by weight, preferably from 15% to 60% by weight, more preferably from 30% to 40% by weight with respect to the blend weight.

Preferably, both the core layers (d1) and (d2) consist of a blend (B), more preferably of the same blend (B), wherein said blend (B) do not include tie resins.

In another embodiment, the core layer(s) (d1) and/or (d2) comprise a major proportion of a polyethylene component (e2), having a bimodal molecular weight distribution and preferably a density from 0.895 to 0.915 g/cc. As known, the density can be measured according to ASTM D792.

Preferably, the core layer(s) (d1) and/or (d2) independently consist of the polyethylene component (e2) or consist of the polyethylene component (e2) in admixture with up to 50% of said second resin (R), as previously defined. Preferably, said second resin (R) is present in amount from 5% to 40%, preferably from 10% to 35%, more preferably from 15% to 30% by weight in respect of the layer (d) weight.

The polyethylene component (e2) is a polyethylene homopolymer or an ethylene-alpha-olefin copolymer having a bimodal molecular weight distribution or an admixture thereof.

Preferably, the polyethylene component (e2) has a density from 0.900 to 0,910 g/cc.

Preferably, both the core layers (d1) and (d2) consist of a polyethylene component (e2) as previously defined.

The polyethylene component (e2) is optionally admixed with a second resin (R) as previously defined. A suitable polyethylene component (e2), having a bimodal molecular weight distribution and a density from 0.895 to 0.915 g/cc is for instance Evolue SP0510 by Prime Polymer Co. Ltd. In one embodiment, when the core layer(s) (d1) and/or (d2) independently comprise a major proportion of a polyethylene component (e2) having a bimodal molecular weight distribution and a density from 0.905 to 0.915, the ratio of the thickness of the first core layer (d1) in respect of the second core layer (d2) (r2) is preferably lower than 2, preferably lower than 1.9, more preferably lower than 1.8.

The Applicant has surprisingly found that a polyethylene component (e1) or (e2) with a density preferably within the ranges shown above, when possibly blended with said second resin (R) in the right amount makes the intermediate tube easily stretchable even at temperatures lower than 100° C., lower than 95° C. or even lower than 90° C. Additionally, the composition, position and thickness of the core layers (d1) and (d2) result in final films with particularly high free shrink.

The polyethylene components (e1) and (e2) may independently consist of a single polyethylene or of an admixture of two or more polyethylenes.

The total thickness of the multilayer film is generally not higher than 250 microns and can be selected depending on the product to be packaged and on the packaging process. The total thickness of the film is preferably from 10 to 150 microns, more preferably from 20 to 120 microns, from 30 to 100 microns, from 35 to 50 microns.

In the present film, the percentage ratio of the total thickness of the first core layer (d1) and the second core layer (d2) in respect of the total thickness of the film (r1) is preferably from 35% to 55%, more preferably from 40% to 50%.

With "total thickness of the first core layer (d1) and the second core layer (d2)" the sum of the thickness of the first core layer (d1) and of the thickness of the second core layer (d2) is meant.

In the present film, the ratio of the thickness of the first core layer (d1) in respect of the second core layer (d2) (r2) is preferably from 0.6 to 2.1, more preferably from 0.9 to 1.9.

The film of the present invention may optionally include one or more inner tie layers. Additional tie layers, well known in the art, can be added to improve interlayer adhesion.

Tie layers typically include one or more tie resins such as modified ethylene-alpha-olefin copolymers, modified copolymers, modified acrylic copolymers and modified acrylate copolymers.

The term "modified" refers to copolymers comprising at least an anhydride functionality, as defined below, grafted thereon and/or copolymerized therewith and/or blended therewith.

Preferably, said anhydride functionality is selected among anhydride of maleic acid, crotonic acid, citraconic acid, itaconic acid and fumaric acid, and includes derivatives of such functionalities, such as acids, esters, and metal salts derived therefrom. Particularly preferred are maleic anhydride grades.

The modified ethylene-alpha-olefin copolymer generally include co-polymers of ethylene with one or more co-monomers selected from ($C_4$-$C_{10}$)-alpha-olefin such as butene-1, hexene-1, octene-1, etc.

Particularly preferred modified ethylene-alpha-olefin copolymers are Admer® NF 538E (anhydride modified very low density polyethylene, density 0.91 g/cc, melt index 4.1 g/10 min at 190° C., 2.16 kg), Admer® NF518E (Maleic Anhydride-Modified Polyethylene, Linear Low Density, density 0.91 g/cc, melt index 3.1 g/10 min at 190° C., 2.16 kg), Admer® QF551E, (Melt Flow Index 5.2 g/10 min at 230° C., 2.16 kg, density 0.89 g/cc) and Admer® NF911E (Maleic Anhydride-Modified Polyethylene, Linear Low Density, density 0.90 g/cc, melt index 2.5 g/10 min at 190° C., 2.16 kg) commercialised by Mitsui Chemical. Other commercially available resins which can be used are for instance Bynel 4125 by DuPont (Melt Flow Index 2.5 g/10 min at 190° C., 2.16 kg, density 0.926 g/cc), Plexar PX3243 by the Lyondell Basell (Melt Flow Index 4.5 g/10 min at 190° C., 2.16 kg, density 0.927 g/cc) and Amplify TY 1354 by Dow (Melt Flow Index 3.0 g/10 min at 190° C., 2.16 kg, density 0.92 g/cc).

The term "modified ethylene-vinyl acetate copolymer" refers to ethylene-vinyl acetate copolymer having an anhydride functionality, as previously defined, grafted thereon and/or copolymerized therewith and/or blended therewith.

In the modified EVA copolymer, the ethylene units are present in a major amount and the vinyl-acetate units are present in a minor amount.

Exemplary commercially available modified EVA resins are Bynel 3101 by DuPont, Bynel 30E671 by Du Pont, Orevac 18211 by Arkema.

Suitable modified acrylic or acrylate based tie resins are for instance BYNEL CXA 21E787 by DuPont. The film of the invention may comprise more than one tie layer. The composition of the two or more tie layers can be the same or different, depending on the chemical nature of the further layers adjacent to said two tie layers.

The thickness of the tie layer (c) may be comprised within the range of 1 to 15 microns, preferably 2 to 12 microns, even more preferably 2.5 to 9 microns.

The films of the present invention may further comprise one or more internal additional layer(s) (f) comprising, preferably consisting of acrylate-based resin, ethylene-vinyl acetate (EVA) or polyolefins.

Preferably, one or more of said layers are positioned in the structure in such a way to insulate the gas-barrier PVDC layer (b) from thermal stress during processing.

Preferably, the additional layers have a thickness between 2 to 30 microns, preferably between 3 and 20 microns, even more preferably between 3 and 15 microns.

Preferably, the internal additional layer(s) comprise EVA, more preferably consist of EVA.

The film of the present invention does not comprise any inner layer comprising a major proportion of polyamide(s) or polyester(s).

Preferably, film of the present invention does not comprise any inner layer comprising more than 40%, 30%, 20%, 10% or 5% of polyamide(s) or polyester(s). More preferably, the present film does not comprise any inner layer comprising polyamide(s) or polyester(s).

The numbers of layers of the films according to the present invention is generally from 4 to 30, preferably from 6 to 20, still more preferably it is lower than 20. In the preferred embodiment, the number of layers of the films according to the present invention is from 6 to 15, even more preferably from 7 to 12.

In all the film layers, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odour absorbers, oxygen scavengers, antistatic agents, anti-fog agents or compositions, and the like additives known to those skilled in the art of packaging films.

The films according to the present invention are oriented, preferably biaxially oriented, and heat-shrinkable.

The present films are preferably characterized by a % free shrink in Longitudinal or Transverse direction of at least 35%, at least 38%, at least 40% at 85° C. in water, according to ASTM D2732.

The present films have preferably a total free shrink at 85° C. higher than 80%, preferably higher than 85%, more preferably higher than 90%.The total free shrink is the sum of the free shrink percentage values measured in the two, longitudinal and transverse, directions of the films according to ASTM D2732.

The present films have preferably a value of haze (%) after shrink at 85° C. in water, measured according to ASTM D1003 on samples prepared as reported in the description, not higher than 25, preferably lower than 20, more preferably lower than 16.

The present films, notwithstanding being non-cross-linked and devoid of inner polyamide(s) and polyester(s) layers, have a good linear tear propagation as shown in the preliminary test described in the present experimental part.

The films of the present invention show good processability, especially in terms of bubble stability, a uniform thickness distribution and planarity. In addition, such films are able to withstand orientation ratios in both the directions, between 2:1 and 6:1 in each direction, preferably between 3:1 and 5:1 in each direction.

Additionally, the films of the present invention can be printed by anyone of the printing methods known in the art.

The present films are non-cross-linked, namely in the manufacture, they are not subjected to any partial or total cross-linking treatment (including irradiation by electronic beam or addition of cross-linking reagents etc . . . ).

The absence of cross-linking within a thermoplastic multilayer film structure is typically revealed by the gel content of the polyolefin component, which may be determined by ASTM D-2765-01 Test Method or by the method described in the present experimental section.

The film of the invention has a negligible gel content, in the polyolefin component, typically lower than 10%, 5% or 1%.

The film of the present invention can be manufactured by co-extrusion, preferably by extrusion coating as described in U.S. Pat. No. 3,891,008, using either a flat or a circular film die that allows shaping the polymer melt into a thin film or tube.

Preferably, the present films are biaxially oriented, more preferably they are simultaneously biaxially oriented.

Preferably, the films according to the present invention can be manufactured by the so-called trapped-bubble process, which is a known process typically used for the manufacture of heat-shrinkable films for food contact packaging. According to said process, the multilayer film is co-extruded preferably through a round die, to obtain a tube of molten polymeric material which is quenched immediately after extrusion without being expanded, then heated to a temperature which is above the Tg of all the resins employed and below the melting temperature of at least one of the resins employed, typically by passing it through a hot water bath, or alternatively by passing it through an IR oven or a hot air tunnel, and expanded, still at this temperature by internal air pressure, to get the transversal orientation, and by a differential speed of the pinch rolls which hold the thus obtained "trapped bubble", to provide the longitudinal orientation. Typical orientation ratios for the films of the present invention can be comprised between 2:1 and 6:1 in each direction, preferably between 3:1 and 5:1.

After having been stretched, the film is quickly cooled while substantially retaining its stretched dimensions to somehow freeze the molecules of the film in their oriented state and rolled for further processing.

Alternatively, the film according to the present invention may be obtained by flat extrusion (co-extrusion or extrusion coating) and, preferably biaxial, stretching by a simultaneous or a sequential tenterframe process.

In a preferred embodiment, the films according to the first object of the present invention are manufactured by the so-called trapped-bubble process. Extrusion coating manufacturing method is particularly preferred.

The present multilayer films are non-cross-linked.

Depending on the number and chemical nature of the layers in the structure, in case of a PVDC based gas barrier layer (c), it may be preferable to split the co-extrusion step: a "substrate" tube will first be formed, with the heat sealable layer (a) on the inside of the tube, preferably comprising the gas-barrier PVDC layer (c)

A tie layer and/or an additional layer can be interposed between said layer and the gas-barrier PVDC layer (c). This tube will be quenched quickly and before submitting it to the orientation step, it will be extrusion-coated with the remaining layers ("coating"), again quickly quenched and then passed to the orientation. During extrusion-coating the tube will be slightly inflated just to keep it in the form of a tube and avoid that it collapses.

The coating step can be simultaneous, by coextruding all the remaining layers altogether, so as to simultaneously adhere all of them, one over the other, to the quenched tube obtained in the first coextrusion step, or this coating step can be repeated as many times as the layers which are to be added. It is particularly advantageous to keep the thermally unstable PVDC layer (c) in the substrate separated from the highest melting resins, if any, by interposition of additional insulating layers and/or by placing the highest melting resins e.g. the polyesters, in the coating structure, thus processing the substrate under lower temperatures and minimizing heat exchange between the layers.

Furthermore, the films according to the present invention have good processability.

In the preferred embodiment, the films according to the first object of the present invention are manufactured by extrusion coating through a round die followed by trapped bubble orientation.

A second object of the present invention is a process for manufacturing the film according to the first object of the present invention which comprises at least the steps of:
- co-extruding, through a round die, a tubular substrate comprising at least
- an outer sealant layer (a),
- a first core layer (d1)
- an inner gas barrier layer (c), preferably comprising polyvinylidene chloride (PVDC);
- quenching such a tubular substrate at temperatures from 5 to 15° C., preferably between 7° C. and 10° C., after extrusion;
- extrusion-coating the tubular substrate with all the remaining layers, thus obtaining an non-oriented tubular film;
- quenching the non-oriented tubular film at temperatures from 5° C. to 30° C., preferably from 8° C. to 25° C.;
- heating the tubular film to a temperature which is above the Tg of all the polymeric resins composing the layers and below the melting temperature of at least one of the resins employed, preferably at a temperature lower than 100° C., preferably lower than 95° C.,
- biaxially orienting the tubular film at orientation ratios from 2 to 6 in each direction, preferably from 3 to 5 in each one of longitudinal and transverse directions,
- quenching the oriented tubular film, preferably in cold air, at a temperature from 4° C. to 30° C., preferably from 5° C. to 10° C.

Another preferred process for manufacturing the film according to the second object of the present invention, comprises the steps of:
- coextruding, through a flat die, a flat substrate comprising at least
- a first outer sealant layer (a),
- a first core layer (d1)

an inner gas barrier layer (c) preferably comprising polyvinylidene chloride (PVDC);

optionally one or more tie layer(s) and/or additional layer(s) (f);

quenching such substrate at temperatures between 5-15° C., preferably at 8-10° C., after extrusion;

extrusion-coating the substrate with all the remaining layers, thus obtaining an un-oriented flat tape;

quenching such un-oriented tape at temperatures from 5° C. to 30° C., preferably from 20° C. to 30° C.;

heating the tape to a temperature which is above the Tg of all the polymeric resins composing the layers and below the melting temperature of at least one of the resins employed;

biaxially orienting the tape a by tenterframe, sequentially or simultaneously, preferably simultaneously, at orientation ratios from 2 to 6, preferably from 3 to 5 in each one of longitudinal and transverse directions, and quenching the oriented film, preferably in cold air, at a temperature from 4° C. to 30° C., preferably from 5° C. to 10° C.

The coextrusion of the substrate, is generally performed at temperatures lower than 250° C., 240° C., 230° C., 200° C., 180° C.

Preferably, the coextrusion of the substrate, is performed at temperatures from 160 to 240° C., preferably from 170 to 230° C.

The coating step can be simultaneous, by coextruding all the remaining layers altogether, so as to simultaneously adhere all of them, one over the other, to the quenched tube obtained in the first coextrusion step, or the coating step can be repeated as many times as the number of layers which are to be added.

The coating of the substrate is generally effected by heating the resins of the coating at temperatures higher than 200° C., 230° C., 250° C., up to 280° C., typically from 200° C. to 270° C.

The tape or tube is then biaxially oriented.

The orientation heating temperature of the tube or of the tape generally ranges for instance from 70 to 98° C. depending on several factors such as the nature and amount of each resin within the tube, the thickness of the tube, the orientation ratios to be achieved as known to the skilled in the art.

After having been stretched, the film is quickly cooled, preferably by cold air, at temperature between 4 e 30° C., preferably between 5-10° C., while substantially retaining its stretched dimensions to somehow freeze the molecules of the film in their oriented state and rolled for further processing.

In a preferred embodiment, the films according to the first object of the present invention are manufactured by extrusion coating followed by orientation.

In a preferred embodiment, the films according to the first object of the present invention are manufactured by round die extrusion-coating followed by trapped-bubble orientation.

Alternatively, the film according to the present invention may be obtained by flat extrusion coating and biaxial stretching by a simultaneous or a sequential tenterframe process.

Preferably, the present manufacturing method includes the preparation of a first substrate by co-extrusion of some of the structure layers—at least the first outer sealant layer (a), the first core layer (d1), the inner PVDC barrier layer (c) and, preferably, at least one tie layer and/or an additional layer (f) and the subsequent deposition thereon of a coating comprising, at least, the polyester layer (b) and optionally the remaining layers.

It was found that this combination of process and layer configuration is particularly advantageous to preserve the integrity of the barrier PVDC resins and to impart high abuse resistance and excellent shrinking properties to the films.

The films of the present invention show very good processability and are able to withstand high orientation ratios. For instance, orientation ratios for the films of the present invention can be comprised between 2 and 6 in each direction, preferably between 3 and 5 in each direction, even more preferably between 3.1 and 4.5 in each direction.

A third object of the present invention is a seamless tube made of a film according to the first object wherein the heat-sealing layer is the innermost layer of the tube.

The seamless tube can be manufactured by extrusion or extrusion coating through a round die of the layers of the present films as previously defined, followed by trapped bubble orientation, as described above.

The resulting seamless tube can be directly processed to furnish flexible packaging containers or, in alternative, can be converted into a flat film by slitting before being wound into rolls or being further re-processed.

A fourth object of the present invention is a flexible container, such as a pouch or bag, obtainable by heat-sealing a film according to the first object to itself.

The self-sealing of the film according to the present invention can be accomplished in a fin seal and/or lap seal mode, preferably by having the heat sealable layer heat sealed to itself, i.e. in a fin seal mode.

The heat-shrinkable flexible containers can be in the form of an end-seal bag (ES), a side (or transverse TS) seal bag or a pouch.

In one embodiment, the flexible container is a lay-flat, end-seal bag made from a seamless tubing, the end-seal bag having an open top, first and second folded side edges, and an end seal across a bottom of the bag.

In one embodiment, the flexible container is a lay-flat, side-seal bag made from a seamless tubing, the side-seal bag having an open top, a folded bottom edge, and first and second side seals.

In one embodiment, the flexible container is a lay-flat, V-shaped side-seal bag made from a seamless tubing, the side-seal bag having an open top, a folded bottom edge, and first and second side seals. Said first and second side seals can be completely angled with respect to the open top, thus providing a triangular or almost triangular bag or, preferably, can be partially straight (i.e. perpendicular to the open top) and partially angled, conferring a more trapezium-like shape.

In one embodiment, the flexible container is a lay-flat pouch made by heat sealing two flat films to one another, the pouch having an open top, a first side seal, a second side seal and a bottom seal.

The flexible container optionally comprises at least one tear initiator. Advantageously, the present films are endowed with a good linear tear propagation.

The films of the present invention can also be supplied in rolls and formed as pouches on conventional horizontal form-fill-seal machines such as for example Flow Wrapper (HFFS), for instance as those supplied by ULMA. In this kind of packaging machine, the product is packaged in a pouch shrunk around the product, said pouch having three-seals: two transversal seals and one longitudinal seal.

Pouches can also be formed just before being filled, for example according to Vertical Form Fill Seal (VFFS) packaging systems. The VFFS process is known to those skilled in the art and described for example in US4589247. The product is introduced through a central, vertical fill tube to a formed tubular film having been sealed longitudinally and transversely at its lower end. The pouch is then completed by sealing the upper end of the tubular segment, and severing the pouch from the tubular film above it.

Other bag and pouch making methods known in the art may be readily adapted to make receptacles or containers from the multilayer film according to the present invention.

A fifth object of the present invention is a package comprising a film according to the first object and a product packaged therein, preferably a food product.

In packaging, the product will be loaded into a preferably heat-shrinkable bag made of the film of the invention, the bag will normally be evacuated, and the open end thereof will be closed by heat-sealing or by applying a clip, e.g. of metal. This process is advantageously carried out within a vacuum chamber where the evacuation and application of the clip or heat seal is done automatically. After the bag is removed from the chamber it is heat shrunk by applying heat. This can be done, for instance, by immersing the filled bag into a hot water bath or conveying it through a hot water shower or a hot air tunnel, or by infrared radiation. The heat treatment will produce a tight wrapping that will closely conform to the contour of the product therein packaged.

A common method of packaging food and non-food products is by means of pouches made on form-fill-seal machines, such as a Horizontal Form-Fill-Seal (HFFS) or a Vertical Form-Fill Seal (VFFS) machine.

A FFS machine, either Horizontal or Vertical, typically includes a former, for forming a flat web of film into a tubular configuration, a longitudinal sealer, to seal the overlapped longitudinal edges of the film in the tubular configuration, a conveyor, for feeding the products into the tubular film one after the other in suitably spaced configuration, or a feeding tube in case of a VFFS machine, and a transverse sealer, for sealing the tubular film in a cross-wise direction to separate the products into discrete packages.

The transverse sealer may be operated to simultaneously seal the bottom of the leading pouch and the front of the following pouch and sever the two seals as well as the leading package from the front sealed tubing.

Alternatively, in the HFFS process, the transverse seal may be operated to sever the leading package from the following tubular portion and sealing the front of said tubular portion thus creating the sealed bottom of the next leading pouch. In this way, the leading pouch containing the product to be packaged has a longitudinal seal and only one transverse seal. It can then be vacuumized before a second transverse seal hermetically closes it. Also in this case, the preferably oriented heat-shrinkable thermoplastic film of the present invention is employed as the packaging material and the vacuumized package is then shrunk to achieve the desired presentation/appearance.

In the FFS processes, while the transverse seals are always fin seals, the longitudinal seal can be either a fin seal or a lap seal, i.e. a seal where the innermost heat sealable layer of the film is sealed to the outermost layer of the same film.

The polymers used for the thermoplastic packaging material and in particular for the heat sealing layer (a) are selected in such a way to provide high seal strengths. This in fact guarantees that the final flexible container will suitably protect the packaged product from the outside environment, without accidental openings or leakers.

The outermost polyester layer (b) is carefully selected for its heat resistance during the sealing step. For example it is advantageous to select for this layer a polymer having melting point higher than the sealing temperature. This selection of resins in the sealant and outer layers provides the flexible containers of the present invention with an excellent stack sealability.

Furthermore, the present containers are easily sealed even through contamination.

A heat shrinkable bag from a film of the invention has wide applications, preferably for food packaging, particularly for fresh meat, fish, poultry, cheese, processed and smoked meat, pork and lamb. The excellent shrink properties of the film will in fact guarantee shrinkage of the bag around the product, so that the bag is not wrinkled, thus offering an attractive package. The bag will have proper abuse resistance in order to survive the process of being filled, evacuated, sealed, closed, heat shrunk, boxed, shipped, unloaded, and stored at the retail supermarket, and a sufficient stiffness for its loading process.

EXAMPLES

The present invention can be further understood by reference to the following examples that are merely illustrative and are not to be interpreted as a limitation to the scope of the present invention that is defined by the appended claims.

In the following examples, the polymers reported in Table 1 below were used:

TABLE 1

| TRADENAME | SUPPLIER | ACRONYM |
| --- | --- | --- |
| LOTRYL 17BA04 | Arkema | EBA1 |
| ELVALOY AC 1218 | DuPont | EMA1 |
| NUCREL 1202 | DuPont | EMAA1 |
| Surlyn 1650 | DuPont | EMAA2 |
| ESCORENE ULTRA FL00119 | ExxonMobil | EVA1 |
| ESCORENE FL 00212 | ExxonMobil | EVA2 |
| 1003 VN 4 | Total Petrochemicals | EVA3 |
| ELVAX 3165 | DuPont | EVA4 |
| Escorene Ultra LD 761.36 | ExxonMobil | EVA5 |
| EB524AA | Westlake Chemical | EVA6 |
| BYNEL CXA 21E787 | DuPont | EMA-md1 |
| BYNEL 3101 | DuPont | EVA-md1 |
| OREVAC 18211 | Arkema | EVA-md2 |
| — | In house blend | LLDPE AB AS |
| Enable 2010CB | ExxonMobil | LLDPE1 |
| Exceed 2018HA | ExxonMobil | LLDPE2 |
| Evolue SP2020H | Mitsui Chemical | LLDPE3 |
| GRILON CF6S | EMS-Grivory | PA 6/12 |
| ULTRAMID C33 | BASF | PA 6/66 |
| Grivory G21 Natural | EMS-Grivory | PA 6I/6T |
| Ramapet W170 | Indorama | PET1 |
| Hytrel 5553FG NC010 | DuPont | PET2 |
| PolyClear PET 5704 | Indorama | PET3 |
| ATMER 7540 | Croda | PETADD1 |
| IXAN PV910 | SolVin | PVDC |
| AFFINITY PL 1281G1 | DOW | VLDPE1 |
| QUEO 1007 | Borealis | VLDPE2 |
| AFFINITY PL 1880G | DOW | VLDPE3 |
| AFFINITY PL 1845G | DOW | VLDPE4 |
| ATTANE SL 4102G | DOW | VLDPE5 |
| Evolue SP0510 | Prime Polymer Co. Ltd | VLDPE6 |
| XUS 61520.15L | DOW | VLDPE7 |
| Engage 8003 | DOW | VLDPE8 |
| AFFINITY PL 1881G | DOW | VLDPE9 | wherein

EBA1: experimental ethylene/butylacrylate copolymer

EMA1: ethylene methyl acrylate copolymer, comonomer content 18%, Density 0.940 g/cc, Melt Flow Rate 2 g/10 min, Melting point 94° C., Vicat softening point 60° C.

EMAA1: ethylene methacrylic acid copolymer, comonomer content Supplier 12%, Density 0.94 g/cc, Melt Flow Rate 1.5 g/10 min, Melting point 99° C., Number Pellets min. 35 max. 55 No., Vicat softening point 75° C.

EMAA2: ethylene methacrylic acid copolymer, comonomer content 12.0%, Density 0.940 g/, Melt Flow Rate 1.50 g/10, Melting point 97.0° C., Moisture Content max. 0.06%, Vicat softening point 73.0° C.

EVA1: ethylene vinyl acetate copolymer, comonomer content 19%, Density 0.942 g/cc, Melt Flow Rate 0.650 g/10 min, Melting point 85.00° C., Vicat softening point 62.00° C.

EVA2: ethylene vinyl acetate copolymer, comonomer content 12%, Density 0.9330 g/cc, Melt Flow Rate 2.50 g/10 min, Melting point 93.0° C.

EVA3: ethylene vinyl acetate copolymer, comonomer content 13.5%, Density 0.935 g/cc, Melt Flow Rate 0.38 g/10 min, Melting point 93° C.

EVA4: ethylene vinyl acetate copolymer, comonomer content 18.00%, Density 0.940 g/cc, Melt Flow Rate 0.70 g/10 min, Melting point 87.0° C., Moisture Content max. 0.3%, Vicat softening point 69.0° C.

EVA5: ethylene vinyl acetate copolymer, comonomer content 27.0% (E-204-2), comonomer content 26.7% (ExxonMobil test), Density 0.951 g/cc, Melt Flow Rate 5.75 g/10 min, Melting point 73° C., Vicat softening point 46° C.

EVA6: ethylene vinyl acetate copolymer, comonomer content 14.5%, Density 0.934 g/cc, Melt Flow Rate 3.5 g/10 min, Melting point 90° C., Vicat softening point 67° C.

EMA-md1: Maleic Anhydride modified ethylene methyl acrylate copolymer, Density 0.930 g/cc, Melt Flow Rate 1.6 g/10 min, Melting point 92° C., Vicat softening point 52° C.

EVA-md1: Maleic Anhydride modified ethylene vinyl acetate copolymer, comonomer content 18.40, Density 0.943 g/cc, Melt Flow Rate 3.20 g/10 min, Melting point 87° C., Vicat softening point 65° C.

EVA-md2: modified ethylene vinyl acetate copolymer content (Maleic Anhydride) 25.7%, comonomer content (Vinyl Acetate) min. 23.4% max. 28%, Density 0.95 g/cc, Melt Flow Rate 3.5 g/10 min, Melting point 72° C.

LLDPE Linear Low Density Polyethylene AB AS is a blend composed by LLDPE 89%: Density 0.918 g/cc, Melt Flow Rate 3.2 g/10 min, Melting point 124° C., Slip Additive (wax) 3.50%: Density 0.8150 g/cc, Melting point 81.0° C., Slip Additive (WAX) 3.50%: Density 0.9950 g/cc, Melting point 146.0° C., Additive AntiBlock (Sodium Aluminosilicate) 4.00%: Density 1.05 g/cc LLDPE1: Linear Low Density Polyethylene, Density 0.920 g/cc, Melt Flow Rate 1.0 g/10 min, Melting point 115° C.

LLDPE2: Linear Low Density Polyethylene, Density 0.918 g/cc, Melt Flow Rate 2.0 g/10 min, Melting point 117° C.

LLDPE3: Linear Low Density Polyethylene, with a bimodal molecular weight distribution Density 0.915 g/cc, Melt Flow Rate 2.1 g/10 min PA 6/12: Polyamide 6/12, Density 1.0500 g/cc, Melt Flow Rate 5.75 g/10 min, Melt Volume Index 195 ml/10 min, Melting point 130° C., Moisture Content max. 0.10%, Viscosity Relative 1.80

PA 6/66: Polyamide 6/66, Density 1.12 g/cc, Melting point 196° C., Moisture Content max 0.08%, Viscosity Relative min. 3.19 max 3.41

PA 6I/6T: Polyamide 6I/6T, Density 1.1800 g/cc, Glass Transition 125° C., Melt Flow Rate 25 g/10 min, Moisture Content max. 0.1%, Refractive Index 1.58

PET1: Polyethylene terephthalate, Density 1.4 g/cc, Glass Transition 78° C., Melting point 245° C., Viscosity Solution 0.71 mPa·sec PET2: Polyethylene terephthalate, Density 1.2 g/cc, Melt Flow Rate 8 g/10 min, Melting point 201° C.

PET3: Polyethylene terephthalate, experimental resin

PETADD1: Polyethylene terephthalate, Density 1 g/cc

PVDC: Polyvinylidenechloride, Bulk (Apparent) Density 0.78 min. g/cc, MA comonomer content 8.4%, Density 1.71 g/cc, Particle size min 220 micron, Viscosity Relative min. 1.44 max. 1.48, Viscosity Solution 1.46 mPa·sec, Volatile Content max. 0.3

VLDPE1: Very Low Density Polyethylene, 1-octene comonomer content 13%, Density 0.9001 g/cc, Gel Area max. 9 mm2, Melt Flow Rate 6.0 g/10 min, Melt Flow Ratio 8

VLDPE2: Very Low Density Polyethylene, Density 0.910 g/cc, Melt Flow Rate 6.6 g/10 min, Melting point 105° C., Viscosity 88 mPa·sec VLDPE3: Very Low Density Polyethylene, Density 0.902 g/cc, Melt Flow Rate 1.1 g/10 min, Melting point 99° C., Vicat softening point 86° C.

VLDPE4: Very Low Density Polyethylene, Density 0.910 g/cc, Melt Flow Rate 3.5 g/10 min, Melting point 103° C., Vicat softening point 95° C.

VLDPE5: Very Low Density Polyethylene, Crystallization point 99° C., Density 0.905 g/cc, Melt Flow Rate 1 g/10 min, Melting point 122° C., Vicat softening point 84° C.

VLDPE6: Very Low Density Polyethylene, with a bimodal molecular weight distribution, density 0.904 g/cc, Melt Flow Rate 1.20 g/10 min VLDPE7: Very Low Density Polyethylene, comonomer content 11.5%, Density 0.903 g/cc, Melt Flow Rate 0.5 g/10 min, Melt Flow Ratio min. 8.5 max. 9.5, Melting point 122° C., Vicat softening point 100° C.

VLDPE8: Very Low Density Polyethylene, Density 0.885 g/cc, Melt Flow Rate 1 g/10 min, Vicat softening point 63° C.

VLDPE9: Very Low Density Polyethylene, Density 0.904 g/cc, Melt Flow Rate 1 g/10 min, Melting point 100° C., Vicat softening point 88° C.

The Examples of films according to the invention (Ex. 1 to 17) are collected in the following Tables 2 to 6 while Comparative films (C1-C8) in Tables 7 to 9.

In the 9 layers films, layer 1 is the outer sealant layer (a), layer 9 is the outer polyester layer (b), layer 4 is the inner gas barrier layer (c) and layers 2 and 7 are the first and the second core layers (d1) and (d2) respectively.

All the following films are non-cross-linked, unless otherwise specifically stated.

TABLE 2

| | Ex. 1 | | Ex. 2 | | Ex. 3 | | Ex. 4 | |
|---|---|---|---|---|---|---|---|---|
| | Composition | Thick. | Composition | Thick. | Composition | Thick. | Composition | Thick. |
| 1 | 80% VLDPE1 20% VLDPE2 | 8 | 80% VLDPE1 20% VLDPE2 | 7.8 | 80% VLDPE1 20% VLDPE2 | 7.8 | 80% VLDPE1 20% VLDPE2 | 7.8 |
| 2 | 85% VLDPE6 15% EVA1 | 11.7 | 70% VLDPE3 30% EVA3 | 12 | 60% VLDPE3 40% EVA1 | 12 | 50% VLDPE4 50% EVA1 | 12 |
| 3 | 100% EVA2 | 2.8 | 100% EVA2 | 2.7 | 100% EVA2 | 2.7 | 100% EVA2 | 2.7 |
| 4 | 100% PVDC | 4.7 | 100% PVDC | 4.7 | 100% PVDC | 4.7 | 100% PVDC | 4.7 |
| 5 | 100% EVA2 | 2.3 | 100% EVA2 | 2.3 | 100% EVA2 | 2.3 | 100% EVA2 | 2.3 |
| 6 | 100% EVA-md1 | 2.8 | 100% EVA-md1 | 2.7 | 100% EVA-md1 | 2.7 | 100% EVA-md2 | 2.7 |
| 7 | 85% VLDPE6 15% EVA1 | 6.6 | 70% VLDPE3 30% EVA3 | 6.6 | 60% VLDPE3 40% EVA1 | 6.6 | 50% VLDPE4 50% EVA1 | 6.6 |
| 8 | 100% EVA-md1 | 3.3 | 100% EVA-md1 | 3.5 | 100% EVA-md1 | 3.5 | 100% EVA-md2 | 3.5 |
| 9 | 100% PET1 | 2.8 | 100% PET1 | 2.7 | 100% PET1 | 2.7 | 100% PET1 | 2.7 |
| | Tot. thickness | 45 | | 45 | | 45 | | 45 |
| | r1 (%) | 40.7 | | 41.3 | | 41.3 | | 41.3 |
| | r2 | 1.8 | | 1.8 | | 1.8 | | 1.8 |
| | r3 (%) | 6.2 | | 6.0 | | 6.0 | | 6.0 |

% are by weight unless otherwise stated;
thick. = thickness in microns
r1: percentage ratio of the total thickness of the first core layer (d1) and the second core layer (d2) in respect of the total thickness of the film
r2: the ratio of the thickness of the first core layer (d1) in respect of the second core layer (d2)
r3: percentage ratio of the thickness of the outer polyester layer (b) in respect of the total thickness of the film TABLE 3a different ratios

| | Ex. 5 | | Ex. 6 | | Ex. 7 | |
|---|---|---|---|---|---|---|
| | Composition | Thick | Composition | Thick | Composition | Thick |
| 1 | 80% VLDPE1 20% VLDPE2 | 7.8 | 80% VLDPE1 20% VLDPE2 | 7.8 | 80% VLDPE1 20% VLDPE2 | 3.5 |
| 2 | 60% VLDPE5 40% EVA1 | 12 | 60% VLDPE3 40% EVA1 | 6.6 | 60% VLDPE3 40% EVA1 | 16.7 |
| 3 | 100% EVA2 | 2.7 | 100% EVA2 | 2.7 | 100% EVA2 | 2.7 |
| 4 | 100% PVDC | 4.7 | 100% PVDC | 4.7 | 100% PVDC | 4.7 |
| 5 | 100% EVA2 | 2.3 | 100% EVA2 | 2.3 | 100% EVA2 | 2.3 |
| 6 | 100% EVA-md1 | 2.7 | 100% EVA-md1 | 2.7 | 100% EVA-md2 | 1.9 |
| 7 | 60% VLDPE5 40% EVA1 | 6.6 | 60% VLDPE3 40% EVA1 | 12 | 60% VLDPE3 40% EVA1 | 7.8 |
| 8 | 100% EVA-md1 | 3.5 | 100% EVA-md1 | 3.5 | 100% EVA-md2 | 2.7 |
| 9 | 100% PET1 | 2.7 | 100% PET1 | 2.7 | 100% PET1 | 2.7 |
| | Total thickness | 45 | | 45 | | 45 |
| | r1 (%) | 41.3 | | 41.3 | | 54.4 |
| | r2 | 1.8 | | 1.8 | | 0.6 |
| | r3 (%) | 6.0 | | 6.0 | | 6.0 |

Key: see the key of Table 2

TABLE 3b different ratios

| | Ex. 8 | | Ex. 9 | |
|---|---|---|---|---|
| | Composition | Thick. | Composition | Thick. |
| 1 | 80% VLDPE1 20% VLDPE2 | 8 | 80% VLDPE1 20% VLDPE2 | 3.5 |
| 2 | 60% VLDPE6 40% EVA1 | 11.7 | 60% VLDPE3 40% EVA1 | 7.8 |
| 3 | 100% EVA2 | 2.8 | 100% EVA2 | 2.7 |
| 4 | 100% PVDC | 4.7 | 100% PVDC | 4.7 |
| 5 | 100% EVA2 | 2.3 | 100% EVA2 | 2.3 |
| 6 | 100% EVA-md1 | 2.8 | 100% EVA-md2 | 1.9 |
| 7 | 60% VLDPE6 40% EVA1 | 6.6 | 60% VLDPE3 40% EVA1 | 16.7 |
| 8 | 100% EVA-md1 | 3.3 | 100% EVA-md2 | 2.7 |
| 9 | 100% PET1 | 2.8 | 100% PET1 | 2.7 |
| | Total thickness | 45 | | 45 |
| | r1 (%) | 40.7 | | 54.4 |
| | r2 | 2.1 | | 0.5 |
| | r3 (%) | 6.2 | | 6.0 |

Key: see the key of Table 2

TABLE 4 blends with LLDPE

|   | Ex. 10 | | Ex. 11 | |
|---|---|---|---|---|
|   | Composition | Thick. | Composition | Thick. |
| 1 | 80% VLDPE1 20% VLDPE2 | 7.8 | 80% VLDPE1 20% VLDPE2 | 8 |
| 2 | 40% VLDPE3 20% LLDPE1 40% EVA1 | 12 | 60% LLDPE3 40% EVA1 | 6.6 |
| 3 | 100% EVA2 | 2.7 | 100% EVA2 | 2.8 |
| 4 | 100% PVDC | 4.7 | 100% PVDC | 4.7 |
| 5 | 100% EVA2 | 2.3 | 100% EVA2 | 2.3 |
| 6 | 100% EVA-md1 | 2.7 | 100% EVA-md1 | 2.8 |
| 7 | 40% VLDPE3 20% LLDPE1 40% EVA1 | 6.6 | 60% LLDPE3 40% EVA1 | 11.7 |
| 8 | 100% EVA-md1 | 3.5 | 100% EVA-md1 | 3.3 |
| 9 | 100% PET1 | 2.7 | 100% PET1 | 2.8 |
|   | Total thickness | 45 |   | 45 |
|   | r1 (%) | 41.3 |   | 40.7 |
|   | r2 | 1.8 |   | 0.6 |
|   | r3 (%) | 6.0 |   | 6.2 |

Key: see the key of Table 2

TABLE 5 blends with acrylates

|   | Ex. 12 | | Ex.13 | | Ex. 14 | | Ex. 15 | |
|---|---|---|---|---|---|---|---|---|
|   | Composition | Thick | Composition | Thick | Composition | Thick | Composition | Thick |
| 1 | 80% VLDPE1 20% VLDPE2 | 7.8 | 80% VLDPE1 20% VLDPE2 | 7.8 | 80% VLDPE1 20% VLDPE2 | 7.8 | 80% VLDPE1 20% VLDPE2 | 8.0 |
| 2 | 60% VLDPE3 40% EMA1 | 12 | 70% VLDPE4 30% EMAA2 | 12 | 85% VLDPE4 15% EMAA2 | 12 | 70% VLDPE6 30% EBA1 | 11.7 |
| 3 | 100% EVA2 | 2.7 | 100% EVA2 | 2.7 | 100% EVA2 | 2.7 | 100% EVA2 | 2.8 |
| 4 | 100% PVDC | 4.7 | 100% PVDC | 4.7 | 100% PVDC | 4.7 | 100% PVDC | 4.7 |
| 5 | 100% EVA2 | 2.3 | 100% EVA2 | 2.3 | 100% EVA2 | 2.3 | 100% EVA2 | 2.3 |
| 6 | 100% EVA-md1 | 2.7 | 100% EVA-md2 | 2.7 | 100% EVA-md2 | 2.7 | 100% EVA-md1 | 2.8 |
| 7 | 60% VLDPE3 40% EMA1 | 6.6 | 70% VLDPE4 30% EMAA2 | 6.6 | 85% VLDPE4 15% EMAA2 | 6.6 | 70% VLDPE6 30% EBA1 | 6.6 |
| 8 | 100% EVA-md1 | 3.5 | 100% EVA-md2 | 3.5 | 100% EVA-md2 | 3.5 | 100% EVA-md1 | 3.3 |
| 9 | 100% PET1 | 2.7 | 100% PET1 | 2.7 | 100% PET1 | 2.7 | 100% PET1 | 2.8 |
|   | Total thickness | 45 |   | 45 |   | 45 |   | 45 |
|   | r1 (%) | 41.3 |   | 41.3 |   | 41.3 |   | 40.7 |
|   | r2 | 1.8 |   | 1.8 |   | 1.8 |   | 1.8 |
|   | r3 (%) | 6.0 |   | 6.2 |   | 6.0 |   | 6.2 |

Key: see the key of Table 2

TABLE 6

Bimodal PE in the core layers

|   | Ex. 16 | | Ex. 17 | |
|---|---|---|---|---|
|   | Composition | Thick. | Composition | Thick. |
| 1 | 80% VLDPE1 20% VLDPE2 | 8 | 85% VLDPE1 15% LLDPE AB AS | 8.0 |
| 2 | 100% VLDPE6 | 11.7 | 85% VLDPE6 15% EVA1 | 11.8 |
| 3 | 100% EVA2 | 2.8 | 100% EVA2 | 2.7 |
| 4 | 100% PVDC | 4.7 | 100% PVDC | 4.5 |
| 5 | 100% EVA2 | 2.3 | 100% EVA2 | 2.3 |
| 6 | 100% EVA-md1 | 2.8 | 100% EVA-md1 | 2.7 |
| 7 | 100% VLDPE6 | 6.6 | 85% VLDPE6 15% EVA1 | 6.8 |
| 8 | 100% EVA-md1 | 3.3 | 100% EVA-md1 | 3.2 |
| 9 | 100% PET1 | 2.8 | 100% PET1 | 2.9 |
|   | Total thickness | 45 |   | 44.9 |
|   | r1 (%) | 40.7 |   | 41.4 |
|   | r2 | 1.8 |   | 1.7 |
|   | r3 (%) | 6.2 |   | 6.5 |

Key: see the key of Table 2

Comparative films C1 to C8 characterized by different thickness or composition of core layers, by the presence of internal layers based on polyamides or polyesters and/or by cross-linking, are collected in the following Tables 7 to 9:

TABLE 7 comparative films (different thickness or composition)

| | C1 Composition | Thickn. | C2 Composition | Thickness | C3 Composition | Thickness |
|---|---|---|---|---|---|---|
| 1 | 80% VLDPE1 20% VLDPE2 | 8 | 80% VLDPE1 20% VLDPE2 | 12.8 | 80% VLDPE1 20% VLDPE2 | 8 |
| 2 | 80% VLDPE3 20% LLDPE2 | 11.8 | 60% VLDPE3 40% EVA1 | 6.6 | 60% LLDPE3 40% EVA1 | 11.7 |
| 3 | 100% EVA2 | 2.7 | 100% EVA2 | 2.7 | 100% EVA2 | 2.8 |
| 4 | 100% PVDC | 4.5 | 100% PVDC | 4.7 | 100% PVDC | 4.7 |
| 5 | 100% EVA2 | 2.3 | 100% EVA2 | 2.3 | 100% EVA2 | 2.3 |
| 6 | 100% EVA-md1 | 2.7 | 100% EVA-md2 | 2.7 | 100% EVA-md1 | 2.8 |
| 7 | 80% VLDPE3 20% LLDPE2 | 6.8 | 60% VLDPE3 40% EVA1 | 7 | 60% LLDPE3 40% EVA1 | 6.6 |
| 8 | 100% EVA-md1 | 3.2 | 100% EVA-md2 | 3.5 | 100% EVA-md1 | 3.3 |
| 9 | 100% PET1 | 2.9 | 100% PET1 | 2.7 | 100% PET1 | 2.8 |
| | Total thickness | 44.9 | | 45 | | 45 |
| | r1 (%) | 41.4 | | 30.2 | | 40.7 |
| | r2 | 1.7 | | 0.9 | | 1.8 |
| | r3 (%) | 6.5 | | 6.0 | | 6.2 |

Key: see the key of Table 2

TABLE 8

Comparative films in which the core layer (d2) - layer 7 - is made of polyamides or polyesters.

| | C4 Composition | Thickness | C5 Composition | Thickness | C6 Composition | Thickness |
|---|---|---|---|---|---|---|
| 1 | 80% VLDPE1 20% VLDPE2 | 7.8 | 80% VLDPE1 20% VLDPE2 | 8 | 80% VLDPE1 20% VLDPE2 | 8 |
| 2 | 60% VLDPE3 40% EVA4 | 12 | 60% VLDPE6 40% EVA1 | 11.7 | 60% VLDPE6 40% EVA1 | 11.7 |
| 3 | 100% EVA2 | 2.7 | 100% EVA2 | 2.8 | 100% EVA2 | 2.8 |
| 4 | 100% PVDC | 4.7 | 100% PVDC | 4.7 | 100% PVDC | 4.7 |
| 5 | 100% EVA2 | 2.3 | 100% EVA2 | 2.3 | 100% EVA2 | 2.3 |
| 6 | 100% EVA-md1 | 2.7 | 100% EVA-md1 | 2.8 | 100% EVA-md1 | 2.8 |
| 7 | 100% PA 6/12 | 6.6 | 80% PA6/66 20% PA6I/6T | 6.6 | 100% PET2 | 6.6 |
| 8 | 100% EVA-md1 | 3.5 | 100% EVA-md1 | 3.3 | 100% EVA-md1 | 3.3 |
| 9 | 100% PET1 | 2.7 | 100% PET1 | 2.8 | 100% PET1 | 2.8 |
| | Total thickness | 45 | | 45 | | 45 |
| | r1 (%) | 41.3 | | 40.7 | | 40.7 |
| | r2 | 1.8 | | 1.8 | | 1.8 |
| | r3 (%) | 6.0 | | 6.2 | | 6.2 |

Key: see the key of Table 2

TABLE 9

Comparative cross-linked film

| | C7 Composition | Thickness | C8 Composition | Thickness |
|---|---|---|---|---|
| 1 | 80% VLDPE1 20% VLDPE2 | 9.0 | 80% VLDPE1 20% LLDPE AB AS | 7.6 |
| 2 | 60% VLDPE3 40% EMAA1 | 12.8 | 55% VLDPE7 15% VLDPE8 30% EVA6 | 9.5 |
| 3 | 100% EVA1 | 6.8 | 55% VLDPE7 15% VLDPE8 30% EVA6 | 9.5 |
| 4 | 100% PVDC | 4.6 | 100% EVA5 | 2.6 |
| 5 | 100% EVA1 | 3.8 | 100% PVDC | 4.8 |
| 6 | 70% VLDPE9 30% EVA3 | 8.2 | 100% EVA5 | 2.4 |

TABLE 9-continued

Comparative cross-linked film

|   | C7 | | C8 | |
|---|---|---|---|---|
|   | Composition | Thickness | Composition | Thickness |
| 7 |   |   | 100% EVA-md1 | 3.2 |
| 8 |   |   | 100% PET3 | 2.8 |
|   | Total thickness | 45.2 | Total thickness | 42.4 |
|   | r1 (%)*** | 46.46 | r1 (%)* | 44.8 |
|   | r2*** | 1.6 | r2* | 1.0 |
|   | — | — | r3 (%)** | 6.6 |

Key: see the key of Table 2;
*referred to layers 2 and 3;
**referred to layer 8;
***referred to layers 2 and 6.

The comparative film C7 is a conventional cross-linked, polyolefin-based reference film, not including stiff resins (no PA, no PET layer) presently on the market. In this film, the outer polyester layer (b) is absent.

In the comparative film C8, both the core layers (d1) and (d2) are between the outer sealant layer (a) and the inner gas barrier layer (c) (layers 2 and 3).

The layers of the films of Tables 2 to 9 are reported in their order of extrusion, from the sealing layer indicated as layer 1 to the outer layer (the latest listed, layer 6 or 9).

The multilayer films of the present experimental part were prepared according to one of the procedure described below.

Procedure A

The multilayer films of the Examples 1-17 and the comparative films C1-C6 (9 layer films) were prepared by extrusion through a round die of a substrate consisting of layer 1 to layer 5.

The extruded multilayer tubular film thus obtained was then quenched with a water cascade at 8° C.,
extrusion coated with layer 6 to layer 9.

The obtained tube was rapidly quenched at 10° C., pre-heated and heated by passing it through hot water baths kept at the Temperatures reported in Table 10, then biaxially oriented by inflating to get transverse orientation and by stretching to get longitudinal orientation. The orientation ratios in the longitudinal direction and in the transverse direction were those reported in Table 10.

The oriented tubular film was finally quenched by cold air at 10° C. and wound in a roll.

The manufacturing of the films of the present invention was particularly smooth, in particular in terms of bubble stability and resistance of the tape to high draw ratios during orientation, of maintenance of good optical properties and of absence of by-products from degradation of the PVDC layer.

However, for the comparative films C1, C2, C4, C5 and C6 the following issues were observed:

C1: This film was obtainable under the conditions depicted with some difficulties in inflating the bubble but a sufficient bubble stability was observed. However, the draw ratio was at its limits and the final free shrink not satisfactory.

C2: During extrusion, there were problems. With a thicker sealant layer, the thickness of the core layer had to be reduced to limit the flows.

C4: This film, comprising a core layer of polyamide (PA 6/12), even if the bubble was harder to be inflated, was easy to be oriented and showed a good processability as expected C5: The final film, when collected into the roll, formed several wrinkles, which negatively affect printing and bag making.

C6: The bubble was harder to be inflated but the structure showed an overall easy processability.

Procedure B

The comparative film C7 was prepared by extrusion through a round die of a substrate consisting of layer 1 to layer 3. The extruded multilayer tubular film thus obtained was then quenched with a water cascade at 8° C., cross-linked at 64 KGy and extrusion coated with layer 4 to layer 6.

The obtained tube was rapidly quenched at 10° C., pre-heated and heated by passing it through hot water baths, kept at the Temperatures reported in Table 10, then biaxially oriented by inflating to get transverse orientation and by stretching to get longitudinal orientation. The orientation ratios in the longitudinal direction and in the transverse direction were those reported in Table 10.

The oriented tubular film was finally quenched by cold air at 10° C., slit and wound in a roll.

Procedure C

The comparative film C8 was prepared by extrusion through a round die of a substrate consisting of layer 1 to layer 3. The extruded multilayer tubular film thus obtained was then quenched with a water cascade at 8° C., cross-linked at 64 kG and extrusion coated with layer 4 to layer 8.

The obtained tube was then rapidly quenched at 10° C., pre-heated and heated by passing it through hot water baths kept at the Temperatures reported in Table 10, then biaxially oriented by inflating to get transverse orientation and by stretching to get longitudinal orientation. The orientation ratios in the longitudinal direction and in the transverse direction were those reported in Table 10.

The oriented tubular film was finally quenched by cold air at 10° C. and wound in a roll.

In the following Table 10, process conditions adopted in the manufacture of the films of the present experimental part are shown:

TABLE 10 orientation conditions

| Film | Preparation procedure | Orientation: pre-heating bath temp.° C. | Orientation: heating bath temp.° C. | Draw ratio LD | Draw ratio TD |
|---|---|---|---|---|---|
| Ex. 1 | A | 88 | 90 | 3.7 | 3.3 |
| Ex. 2 | A | 88 | 90 | 3.7 | 3.6 |
| Ex. 3 | A | 89 | 92 | 3.7 | 3.6 |
| Ex. 4 | A | 88 | 92 | 3.7 | 3.6 |
| Ex. 5 | A | 88 | 90 | 3.7 | 3.6 |
| Ex. 6 | A | 89 | 92 | 3.7 | 3.6 |
| Ex. 7 | A | 89 | 92 | 3.7 | 3.6 |
| Ex. 8 | A | 88 | 88 | 3.5 | 3.3 |
| Ex. 9 | A | 90 | 92 | 3.7 | 3.6 |
| Ex. 10 | A | 88 | 90 | 3.7 | 3.6 |
| Ex. 11 | A | 88 | 90 | 3.7 | 3.3 |
| Ex. 12 | A | 88 | 90 | 3.7 | 3.6 |
| Ex. 13 | A | 88 | 90 | 3.7 | 3.6 |
| Ex. 14 | A | 88 | 90 | 3.7 | 3.6 |
| Ex. 15 | A | 88 | 90 | 3.5 | 3.3 |
| Ex. 16 | A | 88 | 88 | 3.5 | 3.3 |
| Ex. 17 | A | 90 | 92 | 3.5 | 3.3 |
| C1 | A | 88 | 90 | 3.5 | 3.3 |
| C2 | A | 89 | 92 | 3.7 | 3.6 |
| C3 | A | 88 | 90 | 3.5 | 3.3 |
| C4 | A | 88 | 90 | 3.7 | 3.6 |
| C5 | A | 90 | 94 | 3.7 | 3.3 |
| C6 | A | 88 | 90 | 3.7 | 3.3 |

TABLE 10-continued orientation conditions

| Film | Preparation procedure | Orientation: pre-heating bath temp.° C. | Orientation: heating bath temp.° C. | Draw ratio LD | Draw ratio TD |
|---|---|---|---|---|---|
| C7 | B | 88 | 86 | 3.7 | 4 |
| C8 | C | 93 | 93 | 3.7 | 3.5 |

Finally, the Applicant tried the manufacture of similar films in which the polyethylene component (e1) had a density lower than 0.8 g/cc but, in these preliminary experiments, it was not able to obtain the final film as the bubble was unstable and burst during orientation.

Test Methods

The test methods used for the evaluation of the film properties are summarized in the following Table 11:

TABLE 11

| Property | Test method |
|---|---|
| Free shrink at 85° C. in water | ASTM D2732 |
| Haze (Procedure A-Hazemeter) | ASTM D1003 |
| Haze after shrink at 85° C. | ASTM D1003 (measured on sample after shrink at 85° C. in water) |
| Elastic Modulus at 23° C. | ASTM D882 |
| Tensile Strength at 23° C. | ASTM D882 |
| In line abuse resistance | Internal method |
| Sealability (clean conditions) | Internal method |
| Sealability (contaminated conditions) | Internal method |
| Linear tear propagation | Internal method (preliminary test) |
| Gel content | ASTM D-2765-01 or internal method |

Free Shrink: it is the percent dimensional change in a 10 cm×10 cm specimen of film when subjected to a selected heat; it was measured following ASTM Standard Test Method D 2732, immersing the specimen for 5 seconds in a heated water bath at 85° C. The total free shrink is the sum of the percentages of free shrink in the machine (longitudinal) direction and in the transverse (crosswise) direction. The total free shrink is expressed as percentage (%).

The results of this test are reported in the following Table 12:

TABLE 12 shrinking properties

| Film | Free shrink (%) at 85° C. LD | Free shrink (%) at 85° C. TD | Total free shrink (%) at 85° C. LD + TD |
|---|---|---|---|
| Ex. 1 | 46 | 45 | 91 |
| Ex. 2 | 42 | 46 | 88 |
| Ex. 3 | 43 | 44 | 87 |
| Ex. 4 | 39 | 40 | 79 |
| Ex. 5 | 43 | 48 | 91 |
| Ex. 6 | 38 | 42 | 80 |
| Ex. 7 | 41 | 43 | 84 |
| Ex. 8 | 46 | 46 | 92 |
| Ex. 9 | 39 | 40 | 79 |
| Ex. 10 | 43 | 45 | 88 |
| Ex. 11 | 45 | 48 | 93 |
| Ex. 12 | 46 | 47 | 93 |
| Ex. 13 | 40 | 40 | 84 |
| Ex. 14 | 40 | 42 | 82 |
| Ex. 15 | 45 | 48 | 93 |
| Ex. 16 | 45 | 46 | 91 |
| Ex. 17 | 44 | 47 | 91 |
| C1 | 37 | 39 | 76 |
| C2 | 41 | 41 | 82 |
| C3 | 40 | 38 | 78 |
| C4 | 36 | 41 | 77 |
| C5 | 40 | 47 | 87 |
| C6 | 37 | 39 | 76 |
| C7 | 37 | 45 | 82 |
| C8 | 39 | 44 | 83 |

As can be seen from the data reported in Table 12, the films of the present invention show very high free shrink which, advantageously, provides for taut and more appealing packages.

Haze: it was following ASTM D1003 Procedure A-Hazemeter on the unshrunk material.

Haze after shrink at 85° C.: at least 3 test specimens for each material were trimmed to a size 15 cm×15 cm, placed in a pair of metal tongs and subjected to shrink process in hot water at 85° C. for 5 seconds and then cooled down in a cold water bath for 5 seconds. The specimens were then let dry, mounted in the sample holder and haze was measured following ASTM D1003 Procedure A- Hazemeter. The results of this test are reported in Table 13:

TABLE 13

Haze and Haze after shrink at 85° C.

| Film | Haze | Haze after shrink at 85° C. |
|---|---|---|
| Ex. 1 | n.a. | n.a. |
| Ex. 2 | n.a. | 21 |
| Ex. 3 | n.a. | 20 |
| Ex. 4 | n.a. | 15 |
| Ex. 5 | n.a. | 19 |
| Ex. 6 | 3 | 12 |
| Ex. 7 | 5 | 22 |
| Ex. 8 | n.a. | 19 |
| Ex. 9 | 3 | 12 |
| Ex. 10 | n.a. | 18 |
| Ex. 11 | n.a. | n.a. |
| Ex. 12 | n.a. | n.a. |
| Ex. 13 | 5 | 21 |
| Ex. 14 | 6 | 21 |
| Ex. 15 | n.a. | n.a. |
| Ex. 16 | n.a. | 25 |
| Ex. 17 | n.a. | 21 |
| C1 | n.a. | 15 |
| C2 | 4 | 18 |
| C3 | n.a. | 15 |
| C4 | n.a. | 13 |
| C5 | n.a. | 12 |
| C6 | n.a. | 15 |
| C7 | n.a. | 18 |
| C8 | n.a. | n.a | n.a. not available

As can be seen from the optical data of Table 13, the film of the invention show comparable or even better values of haze, before and after shrink, with respect to the marketed film C7.

Elastic modulus at 23° C.: it was evaluated following ASTM D 882.

Tensile Strength at break (ASTM D 882).

Tensile strength represents the maximum tensile load per unit area of the original cross-section of the test specimen required to break it, expressed as kg/cm².

Measurements were performed with Instron tensile tester equipped with a load cell type CM (1-50 kg), in an environmental chamber set at 23° C., on specimens previously stored at 23° C. and 50% RH for minimum of 24 hours. Tensile strength are expressed as average values.

The results of these mechanical tests are reported in Table 14:

TABLE 14 mechanical properties

| Film | Modulus Kg/cm2 | | Tensile Kg/cm2 | |
|---|---|---|---|---|
| | LD | TD | LD | TD |
| Ex. 1 | n.a. | n.a. | n.a. | n.a. |
| Ex. 2 | n.a. | n.a. | n.a. | n.a. |
| Ex. 3 | n.a. | n.a. | 560 | 430 |
| Ex. 4 | n.a. | n.a. | n.a. | n.a. |
| Ex. 5 | n.a. | n.a. | n.a. | n.a. |
| Ex. 6 | 4100 | 4580 | 588 | 445 |
| Ex. 7 | 4250 | 4650 | 607 | 488 |
| Ex. 8 | 4290 | 4360 | 600 | 440 |
| Ex. 9 | 4180 | 4500 | 575 | 462 |
| Ex. 10 | n.a. | n.a. | n.a. | n.a. |
| Ex. 11 | n.a. | n.a. | n.a. | n.a. |
| Ex. 12 | n.a. | n.a. | n.a. | n.a. |
| Ex. 13 | 4720 | 4990 | 717 | 497 |
| Ex. 14 | 4400 | 4570 | 620 | 543 |
| Ex. 15 | n.a. | n.a. | n.a. | n.a. |
| Ex. 16 | n.a. | n.a. | n.a. | n.a. |
| Ex. 17 | 3980 | 3990 | 818 | 457 |
| C1 | 4000 | 4300 | 630 | 500 |
| C2 | 4380 | 4560 | 541 | 411 |
| C3 | 4150 | 4290 | 600 | 430 |
| C4 | 4750 | 4920 | 550 | 440 |
| C5 | 4960 | 4680 | 700 | 710 |
| C6 | 3920 | 4130 | 690 | 510 |
| C7 | 2000 | 2000 | 700 | 730 |
| C8 | n.a. | n.a. | n.a. | n.a. |

As can be seen from the mechanical data of Table 14, the films of the present invention even without internal layers of stiff resins and without cross-linking, show mechanical properties comparable with those of known films comprising inner polyamide or polyester layers and/ or of crosslinked films.

In-line abuse resistance was measured according to an internal test method. The "in-line abuse resistance" is the capability of a structure to withstand without breakage the packaging operations, i.e. loading, vacuumising, sealing, shrinking, and collecting the products through an idle roll conveyor. This is a very demanding assessment of the resistance of a material to the mechanical abuse during a packaging operation on a well-defined packaging line. The packaging line is standardized (both the components and the layout) so that the results obtained on different samples can be compared. Objective of this test is to provide a method to discriminate and rank bags of different structure at a laboratory level as to their mechanical properties. The procedure to test this property is therefore devised to simulate as much as possible the most drastic conditions that might actually occur in the packaging lines. To perform this test, the bags to be examined are filled with metal blocks of constant weight (630 g), vacuumized (residual vacuum below 10 mbar), sealed at the conditions that the skilled in the art is able to set for the specific material under test and shrunk at 85° C. in hot water in a dip tank. The thus obtained packages are then checked for leakers (due to mechanical abrasion and film puncturing) and the in-line abuse resistance is evaluated by the percentage of rejects. This test has a comparative meaning and its aim is to indicate whether a given structure is expected to have, at the customer plant, more or less abuse resistance than a standard bag used for comparison. The results of this test are reported in Table 15:

TABLE 15 in line abuse test (% of rejects)

| Film | % rejects |
|---|---|
| Ex. 1 | 48 |
| Ex. 2 | 52 |
| Ex. 3 | 54 |
| Ex. 4 | 68 |
| Ex. 5 | 56 |
| Ex. 6 | 48 |
| Ex. 7 | 60 |
| Ex. 8 | 54 |
| Ex. 9 | 72 |
| Ex. 10 | 64 |
| Ex. 11 | 68 |
| Ex. 12 | 70 |
| Ex. 13 | 52 |
| Ex. 14 | 54 |
| Ex. 15 | 68 |
| Ex. 16 | 38 |
| Ex. 17 | 52 |
| C1 | 28 |
| C2 | 80 |
| C3 | 94 |
| C4 | 68 |
| C5 | 54 |
| C6 | 64 |
| C7 | 40 |
| C8 | 98 |

As can be seen from the rejects reported in Table 15, this test is very demanding. In fact cross-linked films currently on the market (C7) or comparative films comprising internal layers of stiff resins (C4 to C6) score 40%, 68%, 54% and 64%. The films of the invention, notwithstanding the absence of internal stiff resins and of cross-linking, are comparable if not better than comparative films (see in particular the films of Ex. 1, 2, 6, 13, 14 and 16). The film C1 scored very well in this test but showed scarce shrinking and, as reported below, had bad tear propagation.

In the Applicant experience, films with a score up to 72% or up to 75% in this test may perform acceptably well in conventional packaging applications.

Sealability Under Clean or Contaminated Conditions

This method was developed to evaluate the sealability of a film under both clean and contaminated conditions, when sealed on current customer equipment.

The test is carried out by sealing the sample at different impulse times and measuring the seal strength with a dynamometer. For evaluating the sealing strength under clean conditions, the samples after sealing are conditioned for 24 hours in thermostatic room (23° C.-50% RH).

For the evaluation of seal strength under contamination (blood) the test must completed as soon as possible after contamination. Contamination is performed by brushing and spreading uniformly blood (from primal cuts of fresh red meat) onto the sealing surface.

The seal strengths versus impulse times are represented in a "sealability curve" of the tested materials.

The films according to the invention and the comparative films were sealed on VS20 machine (Vacuum sealing chamber machine with Ultraseal sealing technology) according to the following setting conditions: seal pressure: 4 Bar, Ultraseal: standard factory setting; cooling time: 2 sec, vacuum level: 3-5 mBar, The specimens were cut out as rectangular samples (width: 2.54 cm, length: 10 cm). Each sample is placed in the center of the sealing bar.

Each film has been folded and sealed onto itself (sealant surface (a) sealed onto the same surface) Standard sealing times were: 0.6, 0.8, 1.0 and 1.2 sec.

Twelve specimens were then tested for each sealing condition (clean or contaminated). The seal strength measurement was performed through a dynamometer with a crosshead speed of 300 mm/min and setting up an initial jaw separation of 20 mm. The specimen was clamped in the jaws (one film was clamped in the upper jaw which is movable during the test and the other film on the lower jaw which is fixed) in such a way that the seal is horizontally positioned at equal distance from the two jaws. The test was then started, the crosshead moved up until the seal was broken. The instrument recorded the force needed to open the seal in grams. The average values, among the 12 measured, are reported in the following Table 16:

TABLE 16 seal strengths under clean and contaminated conditions (grf)

|  | sec | Ex. 2 | Ex. 3 | Ex. 17 | C4 | C7 Cross-linked |
|---|---|---|---|---|---|---|
| SEALABILITY clean conditions | 0.6 | 3203 | 2930 | 2620 | 3640 | 5520 |
|  | 0.8 | 3281 | 3080 | 3016 | 3630 | 5102 |
|  | 1 | 3106 | 2980 | 3048 | 2900 | 5326 |
|  | 1.2 | 3031 | 3063 | 3157 | 3450 | 5293 |
| SEALABILITY blood contamination | 0.6 | 1950 | 2070 | n.a. | 3270 | 2240 |
|  | 0.8 | 2022 | 2790 | n.a. | 2160 | 2470 |
|  | 1 | 2186 | 2850 | n.a. | 1640 | 2450 |
|  | 1.2 | 1998 | 2750 | n.a. | 1850 | 2560 |

As can be seen from Table 16, the seal strength of the market reference film C7 under clean conditions is higher than 5000 grf, but this value is halved under contamination.

For the non-cross-linked films, the seal can be so strong that the film subjected to this test failed along interlayer bond rather than along the welding. In facts, the values of strengths reported in Tables 16 for the films of Ex. 2, Ex3 and C4 (non-cross-linked films) are not the strength at which the seal breaks but represent the strength at which the film delaminates (breaking of the film not along the seal but within the film structure).

This behavior demonstrates that the non-cross-linked film of the invention are characterized by exceptionally good sealing properties, which are confirmed under contamination conditions (see the values of strength under contamination, which are only slightly lower or even comparable with those under clean conditions).

However, the comparative film C4, in the sealing test under contamination, performed not so well, as the seal strength decreased for increased sealing times.

Linear tear propagation: this is a qualitative internal test method for evaluating the tearability of a material. A sample of the tubing was cut (full width eight inch long). Using a black permanent marker, a line was drawn about one inch from the open end transversally along the width of the sample. Another line was drawn along the length of the specimen perpendicular to the previous line. A one inch long slit in the longitudinal direction was made using scissors. The sample was shrunk by immersing it for 3-4 seconds into a hot water tank. Then the sample was removed, the specimens were manually gripped on either side of the slit. One side of the slit tubing was pull towards the body while holding the other side stationary. Tear was linear if it propagates along the black line.

Four samples for each film were judged in terms of easy tearability and linearity of the tear according to the following scale:+++very easily tearable and linear tear;++easily tearable, little deviation; + acceptable breaking and/or non-linearity; − difficult or no breaking (tough material)

The results of this preliminary test are shown in Table 17:

TABLE 17

| Film | tear propagation |
|---|---|
| Ex. 1 | + |
| Ex. 2 | ++ |
| Ex. 3 | ++ |
| Ex. 4 | ++ |
| Ex. 5 | ++ |
| Ex. 6 | ++ |
| Ex. 7 | ++ |
| Ex. 8 | ++ |
| Ex. 9 | ++ |
| Ex. 10 | ++ |
| Ex. 11 | ++ |
| Ex. 12 | ++ |
| Ex. 13 | ++ |
| Ex. 14 | + |
| Ex. 15 | ++ |
| Ex. 16 | − |
| Ex. 17 | + |
| C1 | − |
| C2 | ++ |
| C3 | ++ |
| C4 | − |
| C5 | − |
| C6 | − |
| C7 | +++ |
| C8 | ++ |

As can be seen from the data collected in Table 17, most of the film of the invention perform well or very well in this preliminary test, which is predictive of the easy openability of bags and pouches made from the tested material.

Gel Content Determination

The gel content express the percentage of a polymeric material insoluble in toluene and it is an index of the level of cross-linking of the polymer in that material. In case the material is a multilayer film, the test may be carried out on the entire film or on a part of it, by delaminating the desired layers and by not submitting to the test those layers whose polymers are not soluble in toluene per se, such as for instance EVOH or ionomers. Preferably the test is performed on polyolefin components.

The result is expressed as percentage by weight of the undissolved material (i.e. the cross-linked material) after toluene treatment with respect to the total weight of the initial material. The test was performed according to the following procedure.

A square of wire metal gauze (80 mesh,15 cm×15 cm) was cut and cleaned by submersion in a beaker containing toluene. After solvent evaporation, the wire gauze was given a funnel shape and weighted (weight B). 120 ml of toluene were put in a 200 ml beaker and heated on a hot plate.

A sample of the material of about 150 mg was weighted (weight A) and put it in the boiling toluene for 30 minutes, under stirring. The solution was then filtered on the wire gauze and the gel remained on the wire gauze. The wire gauze with the gel was evaporated under hood, weighted (weight C) after 24 h and 48 h up to a constant weight. The gel content percentage was calculated, for each weighing with the following formula: (C−B)/A×100 and the average value was calculated.

Non-cross-linked film typically score lower than 5%, even lower than 1%.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

The invention claimed is:

1. A multilayer heat-shrinkable non-cross-linked packaging film comprising at least:
an outer sealant layer (a),
an outer polyester layer (b),
an inner gas barrier layer (c),
a first core layer (d1) positioned between the outer sealant layer (a) and the inner gas barrier layer (c),
a second core layer (d2) positioned between the inner gas barrier layer (c) and the outer polyester layer (b), and
no inner layer comprising a major proportion of polyamide(s) or polyester(s), characterized in that
the core layers (d1) and (d2) do not comprise a major proportion of tie resins,
the percentage ratio of the total thickness of the first core layer (d1) and the second core layer (d2) in respect of the total thickness of the film (r1) is from 35% to 60%,
the percentage ratio of the thickness of the outer polyester layer (b) in respect of the total thickness of the film (r3) is from 3% to 15%, and
the core layer(s) (d1) and/or (d2) independently comprise a major proportion of (I) a blend (B) of a polyethylene component (e1) not having a bimodal molecular weight distribution and of a second resin (R) selected from ethylene-vinyl acetate copolymer(s) (R1), acrylic acid copolymer(s) (R2), acrylate copolymer(s) (R3) and their admixtures,
wherein said polyethylene component (e1) is present in amount of at least 40% by weight and said second resin (R) is present in an amount of from 10% to 60% by weight in respect of the blend (B) weight, and the ratio of the thickness of the first core layer (d1) in respect of the second core layer (d2) (r2) is from 0.4 to 2.2; or
(II) a polyethylene component (e2) having a bimodal molecular weight distribution, wherein
said polyethylene component (e2) has a density from 0.900 g/cc to 0.910 g/cc, and the ratio of the thickness of the first core layer (d1) in respect of the second core layer (d2) (r2) is from 0.4 to 2.2.

2. The film according to claim 1 wherein said polyethylene component (e1) has a density from 0.895 g/cc to 0.915 g/cc.

3. The film according to claim 1 wherein the percentage ratio of the thickness of the outer polyester layer (b) in respect of the total thickness of the film (r3) is from 5% to 10%.

4. The film according to claim 1 wherein said outer polyester layer (b), comprises more than 70% by weight of aromatic polyester(s) in respect of outer polyester layer (b) weight.

5. The film according to claim 1 wherein the polyester(s) of the outer polyester layer (b) have an intrinsic viscosity (IV) not higher than 0.80 MPa·sec measured according to ASTM D4603-03 and/or a melting point higher than the melting point of the polymer(s) in the outer sealant layer (a).

6. The film according to claim 1 wherein the polyester(s) of the outer polyester layer (b) is an aromatic polyester selected from poly(ethylene 2,6-naphtalate), poly(butylene terephthalate), poly(ethylene terephthalate), copolyesters obtained by reacting one or more aromatic dicarboxylic acids with one or more dihydroxy alcohols, (such as PETG) and their admixtures.

7. The film according to claim 1 wherein the inner gas barrier layer (c) comprises polyvinylidene chloride (PVDC), or the inner gas barrier layer (c) comprises of PVDC.

8. The film according to claim 1 wherein the core layers (d1) and (d2) have the same composition.

9. The film according to claim 1 wherein the core layers (d1) and (d2) independently consists of
the blend (B) or
the polyethylene component (e2) having a bimodal molecular weight distribution or
the polyethylene component (e2) in admixture with said second resin (R), wherein said second resin (R) is present in amount up to 50% by weight in respect of the corresponding core layers (d1) or (d2) weight.

10. The film according to claim 1 wherein the blend (B) comprises from 50% to 90% by weight of said polyethylene component (e1) and/or at least 10% of said second resin (R) with respect to the blend (B) weight.

11. The film according to claim 1 wherein the core layers (d1) and (d2) do not include more than 30%.

12. The film according to claim 1 wherein the total thickness of the film is from 10 to 150 microns.

13. The film according to claim 1 wherein:
(r1) is from 35% to 55%, and/or
(r2) is from 0.6 to 2.1.

14. The film according to claim 1, wherein said film has a total free shrink at 85° C. measured according to ASTM D2732 higher than 80%.

15. The film according to claim 1, wherein said film has a value of haze (%) after shrink at 85° C. in water measured according to ASTM D1003 not higher than 25.

* * * * *